(12) United States Patent
Ishikawa et al.

(10) Patent No.: US 9,558,379 B2
(45) Date of Patent: Jan. 31, 2017

(54) CARD READER

(71) Applicant: NIDEC SANKYO CORPORATION, Nagano (JP)

(72) Inventors: Kazutoshi Ishikawa, Nagano (JP); Kazunori Takahashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 21 days.

(21) Appl. No.: 14/375,241

(22) PCT Filed: Sep. 27, 2013

(86) PCT No.: PCT/JP2013/076311
§ 371 (c)(1),
(2) Date: Jul. 29, 2014

(87) PCT Pub. No.: WO2014/051072
PCT Pub. Date: Apr. 3, 2014

(65) Prior Publication Data
US 2015/0193641 A1 Jul. 9, 2015

(30) Foreign Application Priority Data

Sep. 28, 2012 (JP) ................. 2012-216445
Sep. 28, 2012 (JP) ................. 2012-216446
Sep. 28, 2012 (JP) ................. 2012-217316

(51) Int. Cl.
*G06K 7/00* (2006.01)
*G06K 7/01* (2006.01)
(Continued)

(52) U.S. Cl.
CPC .......... *G06K 7/0004* (2013.01); *G06K 7/0026* (2013.01); *G06K 7/01* (2013.01); *G06K 7/065* (2013.01); *G06K 7/084* (2013.01); *G06K 7/087* (2013.01)

(58) Field of Classification Search
USPC ....................................... 235/440
See application file for complete search history.

(56) References Cited

U.S. PATENT DOCUMENTS

| 6,349,878 B2 * | 2/2002 | Imai .............................. 235/440 |
| 2004/0262389 A1 * | 12/2004 | Nagata ................. G06K 7/0021 235/441 |
| 2012/0234916 A1 * | 9/2012 | Orii ........................ G06K 13/08 235/437 |

FOREIGN PATENT DOCUMENTS

| JP | 9128872 A | 5/1997 |
| JP | 2011248652 A | 12/2011 |

(Continued)

OTHER PUBLICATIONS

International Search Report for International Application PCT/JP2013/076311; date of mailing, Dec. 17, 2013, with English translation.

Primary Examiner — Michael G Lee
Assistant Examiner — David Tardif
(74) Attorney, Agent, or Firm — Cantor Colburn LLP

(57) ABSTRACT

A card reader may include a conveying passage; a magnetic head structured to abut with a magnetic stripe on the card; a head moving mechanism structured to move the magnetic head in a widthwise direction of the conveying passage between an abutting position and a retreated position; an IC contact block having a plurality of IC contact springs to contact a plurality of external connection terminals of an IC chip formed on the card; and a contact block moving mechanism structured to move the IC contact block between a contact position retreated position. The conveying passage may be formed with an opening part through which the magnetic head is passed. The magnetic head may be located at the head abutting position and is abutted with the one face (Continued)

of the card at a time when the IC contact springs and the external connection terminals are contacted with each other.

16 Claims, 12 Drawing Sheets

(51) Int. Cl.
  *G06K 7/06* (2006.01)
  *G06K 7/08* (2006.01)

(56) References Cited

FOREIGN PATENT DOCUMENTS

| | | |
|---|---|---|
| JP | 2013164675 A | 8/2013 |
| WO | 2013118538 A1 | 8/2013 |

\* cited by examiner

CARD READER

CROSS REFERENCE TO PRIOR APPLICATIONS

This is the U.S. national stage of application No. PCT/JP2013/076311, filed on Sep. 27, 2013. Priority under 35 U.S.C. §119(a) and 35 U.S.C. §365(b) is claimed from Japanese Application No. 2012-216445, filed Sep. 28, 2012; Japanese Application No. 2012-214446, filed Sep. 28, 2012; and Japanese Application No. 2012-217316, filed Sep. 28, 2012 the disclosures of which are incorporated herein by reference.

FIELD OF THE INVENTION

At least an embodiment of the present invention relates to a card reader for use with a card which is formed in a substantially rectangular shape and is conveyed in its short widthwise direction and processed.

BACKGROUND

Conventionally, a magnetic head moving type magnetic stripe reading/writing device has been known where reading of magnetic data from a magnetic stripe formed on a magnetic medium and writing of magnetic data to the magnetic stripe are performed (see, for example, Patent Literature 1). A magnetic medium which is processed in the magnetic stripe reading/writing device described in Patent Literature 1 is formed with a magnetic stripe in a direction perpendicular to a conveying direction of the magnetic medium. The magnetic stripe reading/writing device includes a slide mechanism which moves the magnetic head in a direction where the magnetic stripe is formed and conveying rollers for conveying the magnetic medium in a direction perpendicular to the moving direction of the magnetic head. Further, in the magnetic stripe reading/writing device, an opening part for moving the magnetic head is formed in a conveying passage for a magnetic medium.

Further, conventionally, a card reader has been known where data communication is performed with a contact type IC card having a built-in IC chip (see, for example, Patent Literature 2). A surface of a contact type IC card is formed with external connection terminals of an IC chip. The card reader described in Patent Literature 2 includes an IC contact block having IC contact springs for contacting with the external connection terminals of the card.

Further, conventionally, a magnetic head moving type card processing device has been known where reading of magnetic data from a magnetic stripe formed on a card and writing of magnetic data to the magnetic stripe are performed (see, for example, Patent Literature 2). In the card processing device described in Patent Literature 2, a pad is provided for abutting a magnetic head with the magnetic stripe at a predetermined abutting pressure when reading and writing of magnetic data are to be performed. The pad is provided so as to face the magnetic head. Further, the pad is provided over the entire region of a moving range of the magnetic head in a moving direction of the magnetic head.

A shape of a card having a magnetic stripe is specified in the international standard and JIS standard and is formed in a substantially rectangular shape whose four corners are rounded. Further, in a card with a magnetic stripe in conformity with the international standard and JIS standard, the magnetic stripe is formed in a long and thin strip shape which is parallel to a longitudinal direction of the card formed in a substantially rectangular shape and is formed on a rear face of the card. Further, a position of the magnetic stripe in the short widthwise direction of the card is also specified in the international standard and JIS standard and the magnetic stripe is formed in a predetermined range with one end of the card in the short widthwise direction of the card as a reference.

Further, there is an embossing card which is formed with characters, digits or the like formed by embossing. In an embossed card in conformity with the international standard and JIS standard, an embossing area where embossing is performed is determined and a predetermined area with the other end in the short widthwise direction of the card is determined as the embossing area. Further, a predetermined area except both end sides in a longitudinal direction of the card is determined as the embossing area. Characters, digits or the like which are formed in the embossing area by embossing are protruded to a front face side of a card.

CITATION LIST

[PTL 1] Japanese Patent Laid-Open No. Hei 9-128872
[PTL 2] Japanese Patent Laid-Open No. 2011-248652

Shapes of a card with a magnetic stripe and a contact type IC card are specified in the international standard (for example, ISO/IEC 7811) and are formed in a substantially rectangular shape whose four corners are rounded. Further, in a card with a magnetic stripe in conformity with the international standard, a magnetic stripe is formed on one side of faces (specifically, rear face) of the card. In this card, a magnetic stripe is formed in a long and thin strip shape which is parallel to a longitudinal direction of the card formed in a substantially rectangular shape. Further, in a contact type IC card in conformity with the international standard, external connection terminals of an IC chip are formed on the other side of the faces (specifically, front face) of the card.

Like a magnetic stripe reading/writing device described in Patent Literature 1, in a case that a card with a magnetic stripe in conformity with the international standard is to be processed in a device in which a magnetic medium is conveyed in a direction perpendicular to the direction of the magnetic stripe, the card is conveyed in its short widthwise direction. Further, in a case that a contact type IC card is to be processed in a device in which a magnetic medium is conveyed in a direction perpendicular to the direction of the magnetic stripe, it is conceivable that the IC contact block having IC contact springs described in Patent Literature 2 is provided in this magnetic stripe reading/writing device.

On the other hand, in a device where a card is conveyed in its short widthwise direction, when a card with a magnetic stripe is to be processed, an opening part for moving a magnetic head is formed in a conveying passage for the card. As described above, in a card with a magnetic stripe in conformity with the international standard, the magnetic stripe is formed on one side of faces of the card and, in a contact type IC card in conformity with the international standard, its external connection terminals are formed on the other side of the faces of the card. Therefore, in a device where a card is conveyed in a short widthwise direction, for example, in a case that a contact type IC card with a magnetic stripe in conformity with the international standard is to be processed, an opening part for moving a magnetic head is formed in a conveying passage on an opposite side to a side where an IC contact block is disposed. When the opening part for moving a magnetic head is formed in a conveying passage on an opposite side to a side where an IC contact block is disposed, a force for supporting a card becomes weak when IC contact springs are to be contacted with a card and thus a contact pressure of the IC contact springs with the card may be lowered. Further, when a contact pressure of the IC contact springs with a card is lowered, appropriate data communication may be difficult to be performed between the device and a card.

A shape of a card having a magnetic stripe is specified in the international standard and JIS standard and is formed in a substantially rectangular shape whose four corners are rounded. Further, in a card with a magnetic stripe in conformity with the international standard and JIS standard, the magnetic stripe is formed in a long and thin strip shape which is parallel to a longitudinal direction of the card formed in a substantially rectangular shape. Further, a position of the magnetic stripe in the short widthwise direction of the card is specified in the international standard and JIS standard and the magnetic stripe is formed in a predetermined range with one end of the card in the short widthwise direction of the card as a reference.

Like a magnetic stripe reading/writing device described in Patent Literature 1, in a case that a card with a magnetic stripe in conformity with the international standard and JIS standard is to be processed in a device where a magnetic medium is conveyed in a direction perpendicular to the direction of the magnetic stripe, the card is conveyed in its short widthwise direction. Further, as described above, in a card with a magnetic stripe in conformity with the international standard or JIS standard, the magnetic stripe is formed in a predetermined range with one end of the card in the short widthwise direction of the card as a reference. Therefore, when a card with a magnetic stripe in conformity with the international standard or JIS standard is to be processed in the device, it may be occurred that positions of the magnetic head and the magnetic stripe are displaced from each other when reading and writing of magnetic data are to be performed and, as a result, reading and writing accuracy of magnetic data may be lowered.

Further, in a case that a card with a magnetic stripe in conformity with the international standard and JIS standard is to be processed in this device, the magnetic head performs reading and writing of magnetic data while moving in a widthwise direction of the conveying passage perpendicular to a conveying direction of a card in a state that the magnetic head is abutted with the magnetic stripe. On the other hand, in this device, there may be occurred that a card is conveyed to a further inner side relative to the magnetic head for performing various kinds of processing on a card or for collecting a card. Further, there is a case that an embossed card in conformity with the international standard and JIS standard is processed in this device.

In a case that reading and writing of magnetic data are to be performed, when an abutting pressure of the magnetic head with a magnetic stripe is not secured, it may be occurred that appropriate reading and writing of magnetic data are not performed. In a device where a card is conveyed in a direction to be perpendicular to the direction of a magnetic stripe, in order to secure an abutting pressure of the magnetic head with the magnetic stripe, it is conceivable that the pad described in Patent Literature 2 is provided in this device.

However, the pad described in Patent Literature 2 is provided so as to face the magnetic head and is provided over the entire region of a moving range of the magnetic head in a moving direction of the magnetic head. Further, as described above, in an embossed card in conformity with the international standard and JIS standard, characters, digits or the like formed by embossing (hereinafter, these characters, digits or the like are referred to as an "embossed portion") are protruded to a side of a front face of a card. Therefore, in the device including the pad described in Patent Literature 2, when an embossed card in conformity with the international standard and JIS standard is conveyed to a further inner side with respect to the magnetic head, the embossed portion may be contacted with the pad to occur scratches on the embossed portion or to occur abrasion of the pad.

SUMMARY

In view of the problem described above, at least an embodiment of the present invention provides a card reader for use with a card formed in a substantially rectangular shape which is conveyed in its short widthwise direction for processing, for example, even when a card is to be processed on which a magnetic stripe is formed on its one face in parallel with a longitudinal direction of the card and an external connection terminal of an IC chip is formed on the other face, the card reader being capable of securing a contact pressure of an IC contact spring with the external connection terminal.

At least an embodiment of the present invention provides a card reader which is capable of suppressing lowering of reading accuracy and recording accuracy of magnetic data even when a card with a magnetic stripe in conformity with the international standard and JIS standard is conveyed in its short widthwise direction and is processed.

At least an embodiment of the present invention provides a card reader which is capable of securing an abutting pressure of the magnetic head with a magnetic stripe and preventing abrasion of an opposed face of an opposite member facing the magnetic head and preventing damage of the embossed portion even when an embossed card with a magnetic stripe in conformity with the international standard and JIS standard is conveyed in its short widthwise direction and is conveyed to a further rear side relative to the magnetic head for processing.

To achieve the above, at least an embodiment of the present invention provides a card reader for use with a card formed in a substantially rectangular shape which is conveyed in its short widthwise direction and is processed, including a conveying passage where the card is conveyed, a magnetic head structured to abut with a magnetic stripe formed on one face of the card in parallel with a longitudinal direction of the card for performing at least one of reading of magnetic data recorded on the card and recording of magnetic data on the card, a head moving mechanism structured to move the magnetic head in a widthwise direction of the conveying passage which is perpendicular to a conveying direction of the card and to move the magnetic head between a head abutting position where the magnetic head is capable of abutting with the magnetic stripe and a head retreated position where the magnetic head is retreated from the conveying passage, an IC contact block having a plurality of IC contact springs structured to respectively contact with a plurality of external connection terminals of an IC chip formed on the other face of the card, and a contact block moving mechanism for moving the IC contact block between a spring contact position where the IC contact springs are capable of contacting with the external connection terminals and a spring retreated position where the IC contact springs are retreated from the conveying passage. The conveying passage is formed with an opening part through which the magnetic head is passed when the magnetic head is moved in the widthwise direction of the conveying passage, and the magnetic head is located at the head abutting position and is abutted with the one face of the card at a time when the IC contact springs and the external connection terminals are contacted with each other.

In the card reader in accordance with at least an embodiment of the present invention, when the IC contact springs and the external connection terminals are to be contacted with each other, the magnetic head is located at the head abutting position and is abutted with the one face of the card. Therefore, according to at least an embodiment of the present invention, even in a case that an opening part where the magnetic head is passed when the magnetic head is moved is formed in the conveying passage, at the time when the IC contact springs and the external connection terminals are contacted with each other, a card is capable of being supported by the magnetic head and a support force for the card is secured. Accordingly in at least an embodiment of the present invention, for example, even when a card on which a magnetic stripe is formed on its one face in parallel with a longitudinal direction of the card and the external connection terminals of an IC chip are formed on the other face is conveyed in its short widthwise direction for processing, a contact pressure of the IC contact springs with the external connection terminals can be secured.

According to at least an embodiment of the present invention, the magnetic head is capable of being moved to a head retreated position where the magnetic head is retreated from the conveying passage by the head moving mechanism. Therefore, conveyance resistance of a card when the card is conveyed is reduced and occurrence of scratches of the card when the card is conveyed is suppressed.

In at least an embodiment of the present invention, it is preferable that, at the time when the IC contact springs and the external connection terminals are contacted with each other, when viewed in a conveying direction of the card, the magnetic head is overlapped with the IC contact block in a thickness direction of the card. According to this structure, when the IC contact springs are to be contacted with the external connection terminals, a force applied to a card is easily and directly received by the magnetic head. Therefore, at the time when the IC contact springs and the external connection terminals are contacted with each other, a support force for the card can be increased by the magnetic head and, as a result, a contact pressure of the IC contact springs with the external connection terminals can be increased.

In at least an embodiment of the present invention, it is preferable that the card reader includes an opposite member which is formed with an opposed face for abutting the magnetic head located at the head abutting position with the magnetic stripe at a predetermined abutting pressure and, at the time when the IC contact springs and the external connection terminals are contacted with each other, an abutting pressure of the magnetic head with the one face of the card is larger than a contact pressure of the plurality of the IC contact springs with the plurality of the external connection terminals. According to this structure, at the time when the IC contact springs and the external connection terminals are contacted with each other, a card can be prevented by the magnetic head from escaping to a direction where a contact pressure of a plurality of the IC contact springs with a plurality of the external connection terminals is lowered. Therefore, the contact pressure of the IC contact springs with the external connection terminals can be increased.

In at least an embodiment of the present invention, it is preferable that the card reader includes an abutting part with which one end of the card is abutted in a conveying direction of the card, and the card is abutted with the abutting part and is positioned when reading and/or recording of magnetic data by the magnetic head are performed and when communication of data with the card is performed by the IC contact block. According to this structure, the magnetic head and the magnetic stripe can be surely abutted with each other, and the IC contact springs and the external connection terminals can be surely contacted with each other. Further, according to this structure, a card is positioned by the common abutting part when reading and recoding of magnetic data are to be performed by the magnetic head and, when data communication is performed with the card by the IC contact block and thus, in comparison with a case that an abutting part with which a card is abutted when reading and recording of magnetic data are to be performed by the magnetic head and an abutting part with which a card is abutted when data communication is to be performed with the card by the IC contact block are separately provided, a structure of the card reader can be simplified.

On the other hand, in a case that a card is positioned by the common abutting part when reading and recording of magnetic data are to be performed by the magnetic head and, when data communication is to be performed with the card by the IC contact block, a distance in a conveying direction of the card between the opening part and the IC contact block may be short. However, according to at least an embodiment of the present invention, even when a distance in the conveying direction of the card between the opening part and the IC contact block is short, at the time when the IC contact springs and the external connection terminals are contacted with each other, the card is supported by the magnetic head and thus, a contact pressure of the IC contact springs with the external connection terminals can be secured.

In at least an embodiment of the present invention, it is preferable that the abutting part is formed with a support part for supporting the card from a side of the one face of the card. According to this structure, at the time when the IC contact springs and the external connection terminals are contacted with each other, the card is supported by the support part in addition to the magnetic head. Therefore, a support force for a card can be increased when the IC contact springs and the external connection terminals are contacted with each other and, as a result, a contact pressure of the IC contact springs with the external connection terminals can be increased.

To achieve the above, at least an embodiment of the present invention provides a card reader for use with a card formed in a substantially rectangular shape which is conveyed in its short widthwise direction and is processed, including a conveying passage where the card is conveyed, a magnetic head structured to abut with a magnetic stripe formed on one face of the card in parallel with a longitudinal direction of the card for performing at least one of reading of magnetic data recorded on the card and recording of magnetic data on the card, a head moving mechanism structured to move the magnetic head in a widthwise direction of the conveying passage which is perpendicular to a conveying direction of the card and to move the magnetic head between a head abutting position where the magnetic head is capable of abutting with the magnetic stripe and a head retreated position where the magnetic head is retreated from the conveying passage, and an abutting part with which one end of the card in a conveying direction of the card is abutted and by which the card is positioned. The conveying passage is formed with an opening part through which the magnetic head is passed when the magnetic head is moved in the widthwise direction of the conveying passage, and the abutting part is formed with a support part for supporting the card from a side of the one face of the card.

The card reader in accordance with at least an embodiment of the present invention includes an abutting part with which one end of the card in a conveying direction of the card is abutted and by which the card is positioned. Therefore, according to at least an embodiment of the present invention, reading and recording of magnetic data can be performed by moving the magnetic head in a state that, in a card with a magnetic stripe in conformity with the international standard and JIS standard, one end of the card which is a reference for a forming range of the magnetic stripe is abutted with the abutting part and the card is positioned. Accordingly, in at least an embodiment of the present invention, when reading and recording of magnetic data are to be performed, aligning of the magnetic head with the magnetic stripe can be performed with a high degree of accuracy. As a result, according to at least an embodiment of the present invention, even when a card with a magnetic stripe in conformity with the international standard and JIS standard is conveyed in its short widthwise direction and is processed, lowering of reading accuracy and recording accuracy of magnetic data can be suppressed.

Further, in at least an embodiment of the present invention, the abutting part with which one end of the card in a conveying direction of the card is abutted is formed with a support part for supporting the card from a side of the one face of the card. Therefore, in at least an embodiment of the present invention, even in a case that the opening part through which the magnetic head is passed is formed in the conveying passage, when a card whose one end side is deformed toward a side of the one face is taken into an inside of the card reader, the one end side of the deformed card can be supported by the support part and thus a displacement amount on the one end side of the card from the conveying passage can be made small. Accordingly, according to at least an embodiment of the present invention, even when a card whose one end side is deformed toward a side of the one face is taken into an inside of the card reader, flapping of the card when the magnetic head moved from the head retreated position to the head abutting position is to be abutted with the card can be suppressed. As a result, in at least an embodiment of the present invention, even when a card whose one end side is deformed toward a side of the one face is taken into an inside of the card reader, deterioration of reading jitters and recording jitters of magnetic data can be suppressed and lowering of reading accuracy and recording accuracy of magnetic data can be suppressed.

In at least an embodiment of the present invention, the magnetic head is capable of being moved to a head retreated position where the magnetic head is retreated from the conveying passage by the head moving mechanism. Therefore, conveyance resistance for a card when the card is conveyed is reduced and occurrence of scratches of the card when the card is conveyed is suppressed.

In at least an embodiment of the present invention, the card reader includes, for example, an IC contact block having an IC contact spring structured to contact with an external connection terminal of an IC chip formed on the other face of the card and a contact block moving mechanism for moving the IC contact block between a spring contact position where the IC contact spring is capable of contacting with the external connection terminal and a spring retreated position where the IC contact spring is retreated from the conveying passage. In at least an embodiment of the present invention, the opening part through which the magnetic head is passed when the magnetic head is moved is formed in the conveying passage and thus a force for supporting a card may be weakened when the IC contact spring is contacted with the external connection terminal to lower a contact pressure of the IC contact spring with the external connection terminal. However, according to at least an embodiment of the present invention, the support part which supports a card from a side of the one face is formed in the abutting part and thus, even when the opening part where the magnetic head is passed is formed in the conveying passage, the card is supported by the support part when the IC contact spring and the external connection terminal are contacted with each other. Therefore, when the IC contact spring and the external connection terminal are contacted with each other, a support force for the card can be secured and, as a result, a contact pressure of the IC contact spring with the external connection terminal can be secured.

In at least an embodiment of the present invention, it is preferable that the card reader includes a positioning member which is formed with the abutting part and is capable of turning with the widthwise direction of the conveying passage as an axial direction of turning and a sensor for detecting movement of the positioning member, and that it is detected that the card has been positioned in the conveying direction of the card based on a detected result by the sensor. According to this structure, in comparison with a case that another member is provided for detecting that a card is positioned in the conveying direction of the card in addition to the positioning member formed with the abutting part, the structure of the card reader can be simplified.

In at least an embodiment of the present invention, it is preferable that the card reader includes a card conveying mechanism structured to convey the card and a retreating mechanism structured to retreat the abutting part from the conveying passage, and that the card conveying mechanism includes a conveying roller which is disposed on a rear side relative to the abutting part in a taking-in direction of the card and is structured to abut with and convey the card. According to this structure, when the abutting part is retreated, a card can be conveyed to a rear side in a taking-in direction of the card by the conveying roller. Therefore, various kinds of processing can be performed on a card or a card can be collected on a rear side of the card reader in a taking-in direction of the card.

In at least an embodiment of the present invention, it is preferable that an end face on a conveying passage side of the support part is formed in an inclined face which is inclined in a direction separated from the conveying passage toward a front side in a taking-in direction of the card when viewed in the widthwise direction of the conveying passage. According to this structure, even when a card whose one end side in the conveying direction of the card is deformed toward a side of the one face is taken into an inside of the card reader, the one end of the card can be guided to a portion of the abutting part where the card is to be abutted.

In at least an embodiment of the present invention, it is preferable that an end face on a front side of the abutting part in a taking-in direction of the card is formed with a cut-out part whose width in a thickness direction of the card becomes gradually narrower toward a rear side in the taking-in direction of the card when viewed in the widthwise direction of the conveying passage, and one end side of the cut-out part in the thickness direction of the card is formed to be the support part. According to this structure, even when a card whose one end side in the conveying direction of the card is deformed toward a side of the one face or a card whose one end side in the conveying direction of the card is deformed toward a side of the other face is taken into an inside of the card reader, the one end of the card can be guided to a portion of the abutting part where the card is to be abutted.

To achieve the above, at least an embodiment of the present invention provides a card reader for use with a card formed in a substantially rectangular shape which is conveyed in its short widthwise direction and is processed, including a card conveying mechanism structured to convey the card, a conveying passage where the card is conveyed, a magnetic head structured to abut with a magnetic stripe formed on one face of the card in parallel with a longitudinal direction of the card for performing at least one of reading of magnetic data recorded on the card and recording of magnetic data on the card, a head moving mechanism structured to move the magnetic head in a widthwise direction of the conveying passage which is perpendicular to a conveying direction of the card and to move the magnetic head between a head abutting position where the magnetic head is capable of abutting with the magnetic stripe and a head retreated position where the magnetic head is retreated from the conveying passage, and an opposite member which is formed with an opposed face for abutting the magnetic head located at the head abutting position with the magnetic stripe at a predetermined abutting pressure. The card conveying mechanism includes a first conveying roller, which is disposed on a front side relative to the magnetic head in the taking-in direction of the card for contacting with the card and conveying the card, and a second conveying roller which is disposed on a rear side relative to the magnetic head in the taking-in direction of the card for contacting with the card and conveying the card and, when a direction perpendicular to the conveying direction of the card and the widthwise direction of the conveying passage is referred to as a height direction of the conveying passage, the opposite member is disposed on one side of the conveying passage in the height direction of the conveying passage, and the second conveying roller is disposed so that a contact position of the second conveying roller with the card is located on the other side in the height direction of the conveying passage with respect to a contact position of the first conveying roller with the card.

In at least an embodiment of the present invention, for example, the contact position of the first conveying roller with the card is set to be substantially the same position as the opposed face in the height direction of the conveying passage. Further, in at least an embodiment of the present invention, for example, the card conveying mechanism includes a first pad roller, which is oppositely disposed to the first conveying roller and is urged toward the first conveying roller, and a second pad roller which is oppositely disposed to the second conveying roller and is urged toward the second conveying roller.

The card reader in accordance with at least an embodiment of the present invention includes an opposite member which is formed with an opposed face for abutting the magnetic head located at the head abutting position with the magnetic stripe at a predetermined abutting pressure. Therefore, according to at least an embodiment of the present invention, even when an embossed card with a magnetic stripe in conformity with the international standard and JIS standard is conveyed in its short widthwise direction for processing, an abutting pressure of the magnetic head with a magnetic stripe can be secured.

Further, in the card reader in accordance with at least an embodiment of the present invention, the card conveying mechanism includes a first conveying roller, which is disposed on a front side relative to the magnetic head in the taking-in direction of the card, and a second conveying roller which is disposed on a rear side relative to the magnetic head in the taking-in direction of the card, and the opposite member is disposed on one side of the conveying passage in the height direction of the conveying passage, and the second conveying roller is disposed so that a contact position of the second conveying roller with the card is located on the other side in the height direction of the conveying passage with respect to a contact position of the first conveying roller with the card. In other words, in at least an embodiment of the present invention, the second conveying roller is disposed so that a contact position of the second conveying roller with a card is separated from the opposed face in the height direction of the conveying passage relative to a contact position of the first conveying roller with the card. Therefore, according to at least an embodiment of the present invention, a card which is contacted with the second conveying roller and is conveyed toward a rear side relative to the magnetic head is moved in a direction separated from the opposed face. Accordingly, in at least an embodiment of the present invention, an embossed portion of a card conveyed to a rear side relative to the magnetic head is prevented from contacting with the opposed face. Alternatively, a contact pressure of an embossed portion of a card conveyed to a rear side relative to the magnetic head with the opposed face can be reduced. As a result, in at least an embodiment of the present invention, even when an embossed card with a magnetic stripe in conformity with the international standard and JIS standard is conveyed in its short widthwise direction and is conveyed to a rear side relative to the magnetic head for processing, abrasion of the opposed face of the opposite member and damage of the embossed portion can be prevented.

For example, even if the second conveying roller is disposed so that a contact position of the second conveying roller with a card and a contact position of the first conveying roller with the card are set to be the same as each other in the height direction, when it is structured that the opposite member is retreated to one side, contacting of the embossed portion of the card conveyed to a rear side relative to the magnetic head with the opposed face can be prevented, or a contact pressure of the embossed portion of the card conveyed to a rear side relative to the magnetic head with the opposed face can be reduced. However, in this case, a mechanism for retreating the opposite member is required and thus the structure of the card reader becomes complicated.

In at least an embodiment of the present invention, it is preferable that the card reader includes an abutting part with which one end of the card in the conveying direction of the card is abutted and by which the card is positioned and a retreating mechanism structured to retreat the abutting part from the conveying passage, and that the abutting part is disposed between the magnetic head and the second conveying roller in the conveying direction of the card. According to this structure, reading and recording of magnetic data are performed by moving the magnetic head in a state that, in a card with a magnetic stripe in conformity with the international standard and JIS standard, one end of the card which is a reference for a forming range of the magnetic stripe is abutted with the abutting part and the card is positioned. Therefore, when reading and recording of magnetic data are to be performed, aligning of the magnetic head with the magnetic stripe can be performed with a high degree of accuracy and, as a result, lowering of reading accuracy and recording accuracy of magnetic data can be suppressed. Further, according to this structure, the abutting part is disposed between the magnetic head and the second conveying roller in a conveying direction of a card and thus, when reading and recording of magnetic data are to be performed, a card may be conveyed by using the first conveying roller (in other words, without using the second conveying roller) until the card is abutted with the abutting part. Therefore, even when a contact position of the first conveying roller with a card and a contact position of the second conveying roller with the card is displaced from each other in the height direction of the conveying passage, a conveying state of the card which is conveyed for performing reading and recording of magnetic data can be stabilized.

In at least an embodiment of the present invention, it is preferable that an embossing area where embossing is performed is determined in the card and, when the one end of the card in the conveying direction of the card is abutted with the abutting part, the embossing area is disposed on a front side relative to the opposed face in the taking-in direction of the card. According to this structure, the embossed portion of a card which is conveyed for performing reading and recording of magnetic data does not contact with the opposed face. Therefore, damage of the embossed portion accompanied with a conveying operation for performing reading and recording of magnetic data can be surely prevented and abrasion of the opposed face can be prevented surely.

As described above, in at least an embodiment of the present invention, in a card reader for use with a card formed in a substantially rectangular shape which is conveyed in its short widthwise direction and is processed, for example, even when the card on which a magnetic stripe is formed on its one face in parallel with a longitudinal direction of the card and the external connection terminals of an IC chip are formed on the other face is processed, a contact pressure of the IC contact springs with the external connection terminals can be secured.

Further, in the card reader in accordance with at least an embodiment of the present invention, even when a card with a magnetic stripe in conformity with the international standard and JIS standard is conveyed in its short widthwise direction and is processed, lowering of reading accuracy and recording accuracy of magnetic data can be suppressed.

Further, in the card reader in accordance with at least an embodiment of the present invention, even when an embossed card with a magnetic stripe in conformity with the international standard and JIS standard is conveyed in its short widthwise direction and is conveyed to a rear side relative to the magnetic head for processing, abrasion of the opposed face of the opposite member and damage of the embossed portion can be prevented while an abutting pressure of the magnetic head with a magnetic stripe is secured.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.

(Schematic Structure of Card Reader)

Figure 1:
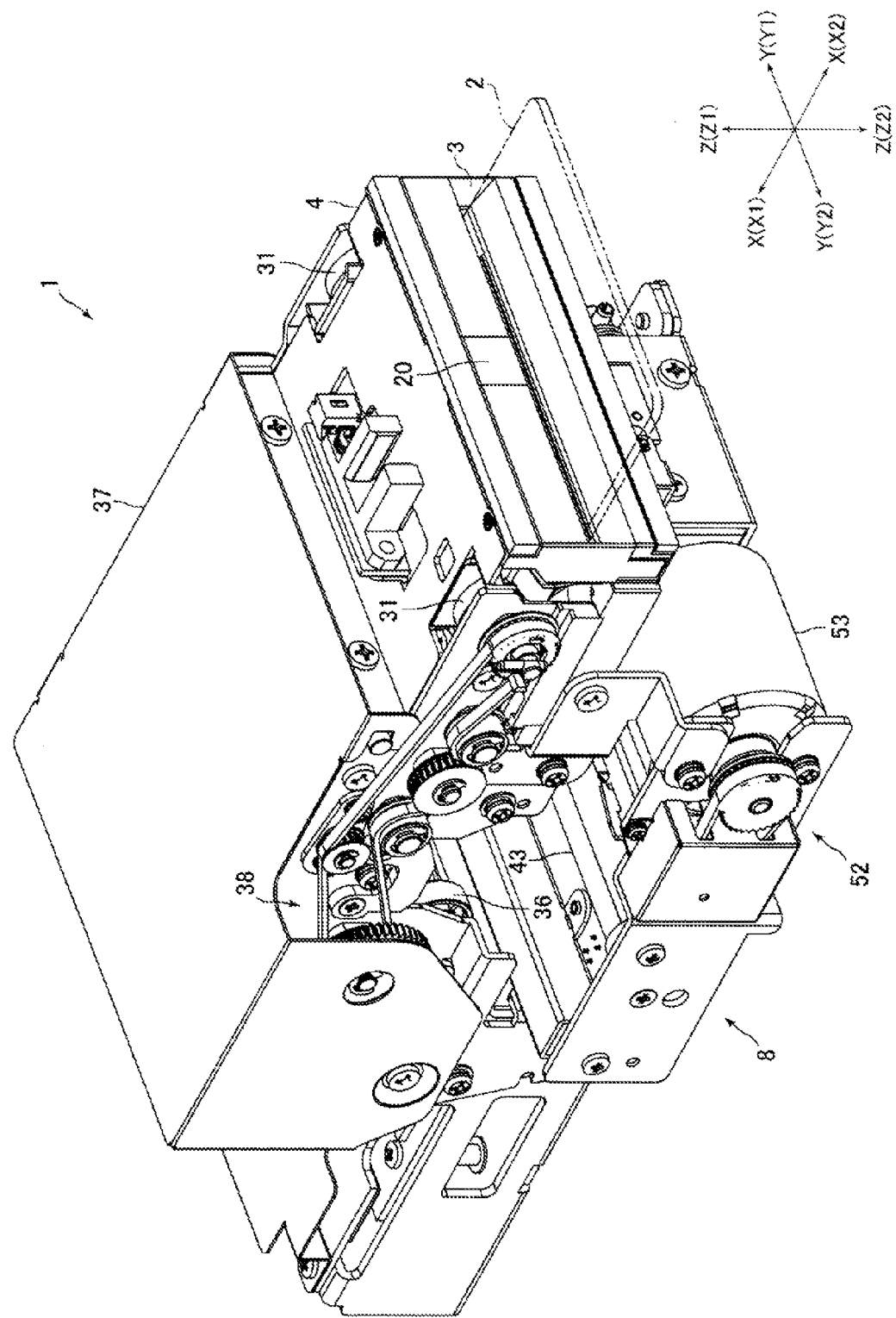
FIG. 1 is a perspective view showing a card reader in accordance with an embodiment of the present invention.
Figure 2:
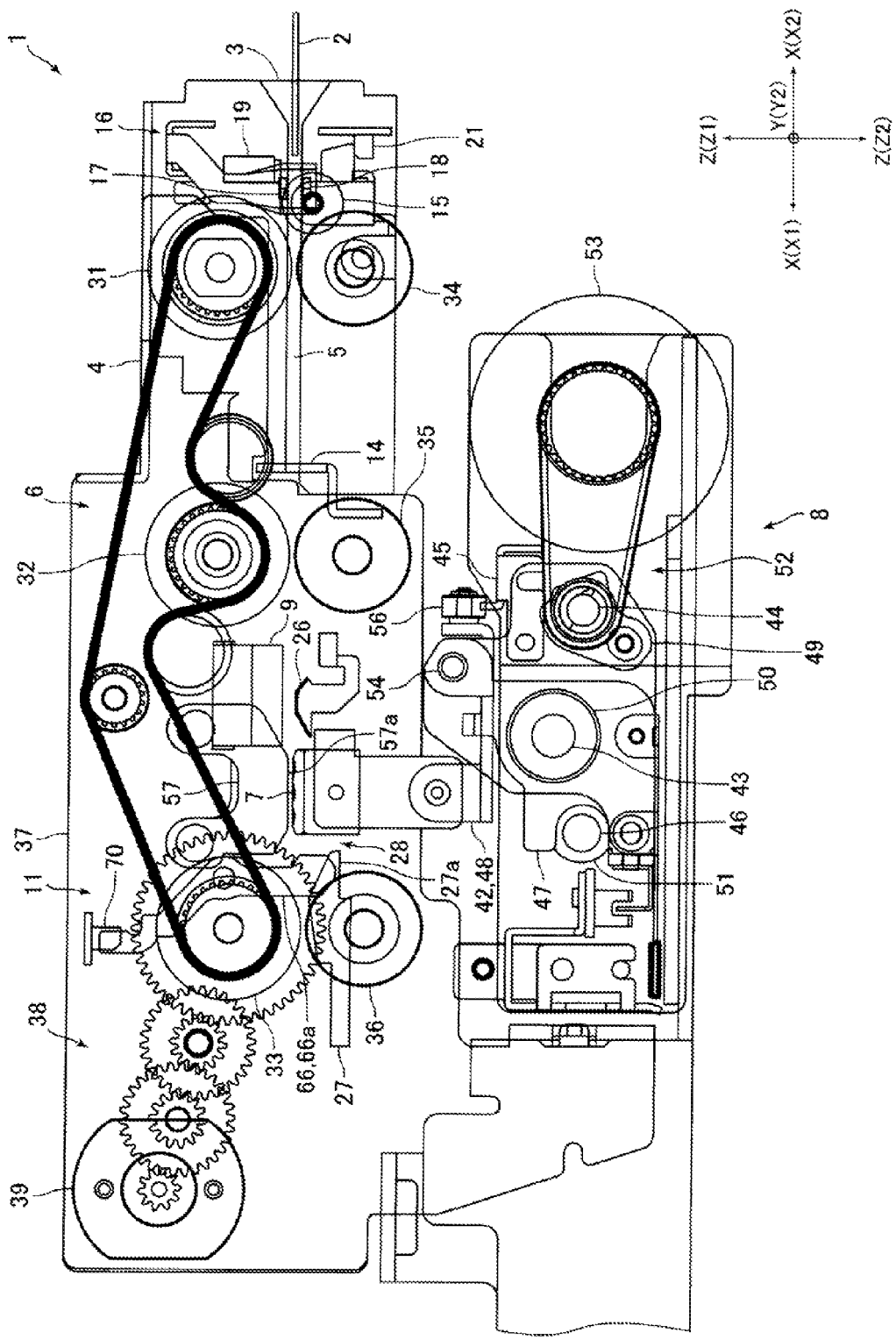
FIG. 2 is a side view for explaining a schematic structure of the card reader shown in FIG. 1.
Figure 3:
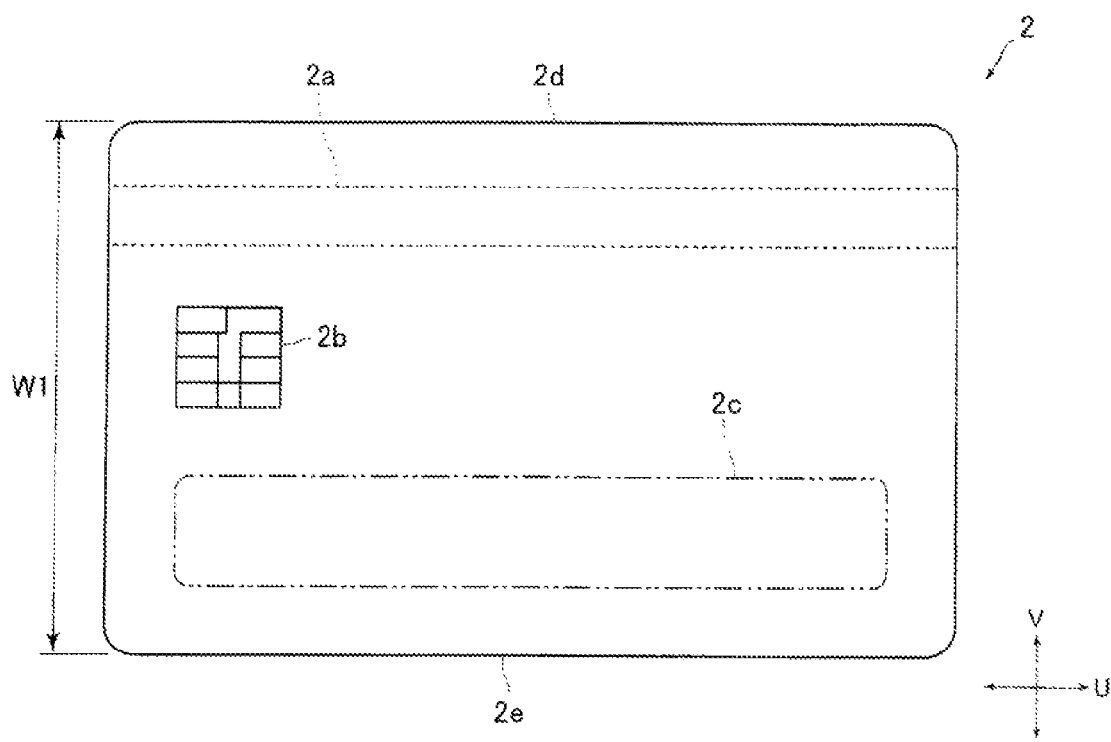
FIG. 3 is a plan view showing a card in FIG. 1.
Figure 4:
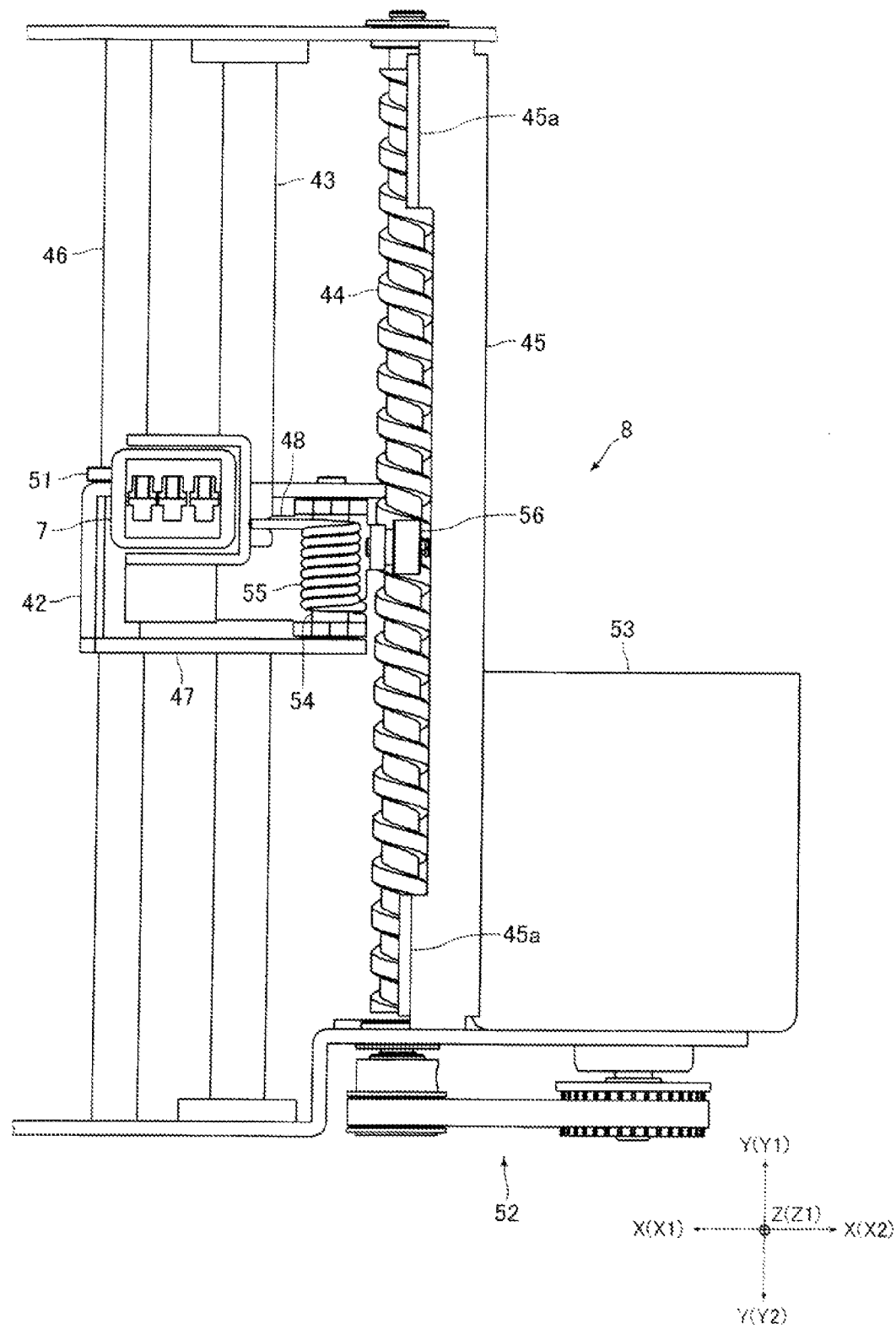
FIG. 4 is a top plan view for explaining a structure of a head moving mechanism shown in FIG. 2.

FIG. 1 is a perspective view showing a card reader 1 in accordance with an embodiment of the present invention. FIG. 2 is a side view for explaining a schematic structure of the card reader 1 shown in FIG. 1. FIG. 3 is a plan view showing a card 2 in FIG. 1.

The card reader 1 in this embodiment is a device for performing at least one of reading of magnetic data recorded on a card 2 and recording of magnetic data to the card 2 and is mounted and used in a predetermined host device such as an ATM (Automated Teller Machine). The card reader 1 includes a card insertion part 4 which is formed with an insertion port 3 into which a card 2 is inserted. As shown in FIG. 2, a conveying passage 5 where a card 2 is conveyed is formed in an inside of the card reader 1. The conveying passage 5 is formed so as to be connected with the insertion port 3.

Figure 6A:
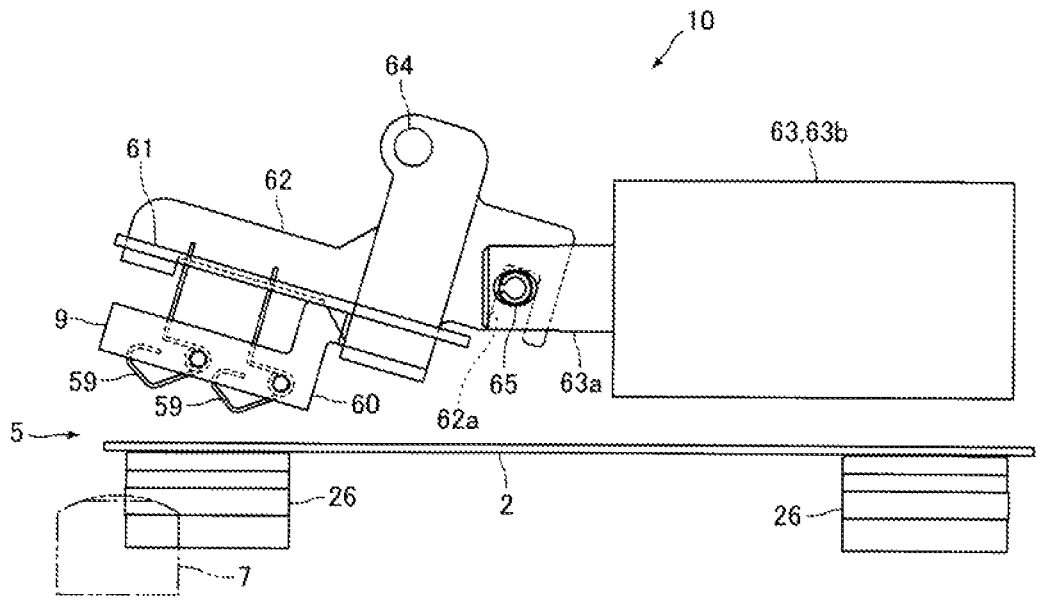
FIGS. 6(A) and 6(B) are front views for explaining a contact block moving mechanism which drives an IC contact block shown in FIG. 2.
Figure 6B:
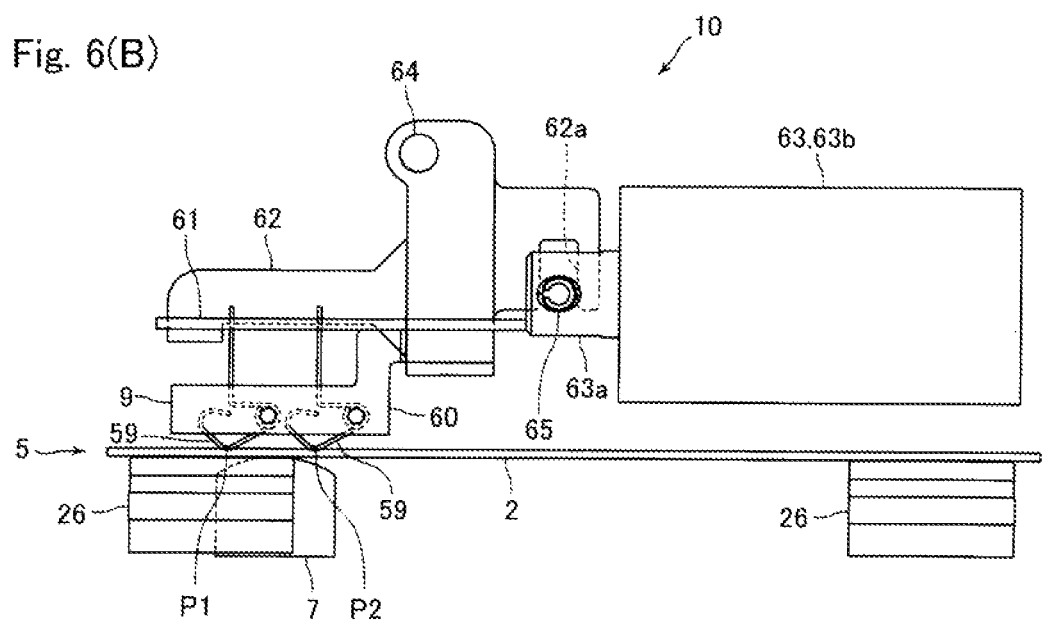
Figure 6B:
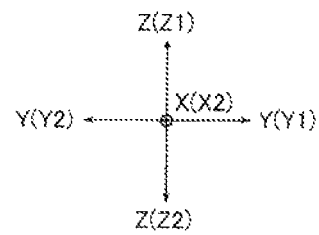

Further, the card reader 1 includes a card conveying mechanism 6 for conveying a card 2, a magnetic head 7 which is structured to abut with the card 2 and to perform reading of magnetic data recorded on the card 2 and recording of magnetic data to the card 2, a head moving mechanism 8 which is structured to move the magnetic head 7 in a direction perpendicular to a conveying direction of the card 2, an IC contact block 9 which is structured to contact with a terminal part 2b described below formed on the card 2 for performing communication of data, a contact block moving mechanism 10 (see FIGS. 6(A) and 6(B)) for moving the IC contact block 9, and a positioning mechanism 11 for positioning the card 2 which is taken into an inside of the card reader 1.

The card 2 is a card made of vinyl chloride whose thickness is about 0.7-0.8 mm. A card 2 in this embodiment is an embossed card with a magnetic stripe in conformity with the international standard (for example, ISO/IEC7811) or JIS standard (for example, JISX6302) and is formed in a substantially rectangular shape whose four corners are rounded. A rear face of the card 2 is formed with a magnetic stripe 2*a* in which magnetic data are recorded. Further, the card 2 is a contact type IC card. In other words, the card 2 has a built-in IC chip and a front face of the card 2 is formed with a terminal part 2*b* comprised of eight external connection terminals. A part of the card 2 is formed as an embossing area 2*c* where embossing is performed. In other words, the card 2 is determined with an embossing area 2*c* where embossing is performed.

The magnetic stripe 2*a* is formed in a long and thin strip shape which is parallel to a longitudinal direction ("U" direction in FIG. 3) of the card 2 formed in a substantially rectangular shape. The magnetic stripe 2*a* is formed over the entire region in the longitudinal direction of the card 2. Further, the magnetic stripe 2*a* is formed on one end 2*d* side in the short widthwise direction ("V" direction in FIG. 3) of the card 2. Specifically, the magnetic stripe 2*a* is formed within a predetermined region with the one end 2*d* of the card 2 as a reference in the short widthwise direction of the card 2 based on the international standard or JIS standard.

The terminal part 2*b* is formed on one end side in the longitudinal direction of the card 2 and at a roughly center position in the short widthwise direction of the card 2. Eight external connection terminals which structure the terminal part 2*b* are arranged in four lines in the short widthwise direction of the card 2 and in two rows in the longitudinal direction of the card 2. The embossing area 2*c* is provided on the other end 2*e* side in the short widthwise direction of the card 2. Specifically, based on the international standard and JIS standard, a predetermined area with the other end 2*e* in the short widthwise direction of a card 2 as a reference is determined as the embossing area 2*c*. Further, the embossing area 2*c* is formed in a predetermined area except both end sides in the longitudinal direction of the card 2. Characters, digits or the like which are formed in an embossing area by embossing are protruded to a side of a front face of a card.

In this embodiment, a card 2 is conveyed in an "X" direction which is shown in FIG. 1 and the like. Specifically, a card 2 is taken in an "X1" direction and the card 2 is ejected in an "X2" direction. In other words, the "X" direction is a conveyance direction of a card 2, the "X1" direction is a taking-in direction of the card 2, and the "X2" direction is an ejecting direction of the card 2. Further, in this embodiment, a card 2 is taken into the card reader 1 so that the short widthwise direction of the card 2 is coincided with the "X" direction. Further, the card 2 is conveyed in an inside of the card reader 1 so that the short widthwise direction of the card 2 is coincided with the "X" direction. In other words, the card reader 1 conveys a card 2 in the short widthwise direction of the card 2 to perform predetermined processing.

Further, the "Y" direction which is perpendicular to the "X" direction is a widthwise direction of the conveying passage 5 and is a longitudinal direction of a card 2 which is taken into the card reader 1 in a normal attitude. Further, a "Z" direction in FIG. 1 and the like perpendicular to the "X" direction and the "Y" direction is a height direction of the conveying passage 5 and is a thickness direction of a card 2 taken into an inside of the card reader 1. In this embodiment, the card reader 1 is disposed so that the "Z" direction and the vertical direction are coincided with each other. In the following descriptions, the "X" direction is referred to as a "front and rear direction", the "Y" direction is referred to as a "right and left direction" and the "Z" direction is referred to as an "upper and lower direction". Further, the "X1" direction side is referred to as a "rear" (back) side, the "X2" direction side is referred to as a "front" side, the "Y1" direction side is a "right" side, the "Y2" direction side is a "left" side, the "Z1" direction side is an "upper" side, and the "Z2" direction side is a "lower" side.

(Structure of Card Insertion Part)

The card insertion part 4 structures a front face side portion of the card reader 1. The card insertion part 4 includes shutter members 14 and 15 disposed on a rear side relative to the insertion port 3, an insertion detection mechanism 16 for detecting a card 2 having been inserted into the card reader 1 (in other words, a card 2 having been inserted into the insertion port 3) so that the short widthwise direction of a card 2 is coincided with the front and rear direction, magnetic sensors 17 and 18 for detecting that magnetic data are recorded in the card 2, a metal sensor 19 for detecting that external connection terminals of an IC chip are fixed to a card 2 (in other words, the terminal part 2*b* is fixed), and a human body detecting infrared sensor 20 for detecting a human motion ahead of the card reader 1.

The shutter member 14 is disposed at a rear end of the card insertion part 4. The shutter member 14 is movable between a close position where the shutter member 14 is disposed in the conveying passage 5 to close the conveying passage 5 and an open position where the shutter member 14 is retreated to a lower side relative to the conveying passage 5 to open the conveying passage 5. The shutter member 14 is connected with a drive mechanism for the shutter member 14 having a solenoid and the like.

The shutter member 15 is disposed on a front side relative to the shutter member 14. The shutter member 15 in this embodiment is a rotatable roller with the right and left direction as an axial direction of rotation. This shutter member 15 is movable between a close position where the shutter member 15 is disposed in the conveying passage 5 to close the conveying passage 5 and an open position where the shutter member 15 is retreated to a lower side relative to the conveying passage 5 to open the conveying passage 5. The shutter member 15 in this embodiment is urged to the close position by an urging member not shown and, when a card 2 inserted from the insertion port 3 is contacted with the shutter member 15, the shutter member 15 is moved to the open position. Further, the card insertion part 4 includes a sensor 21 for detecting that the shutter member 15 is moved to the open position.

The insertion detection mechanism 16 is disposed at a substantially same position as the shutter member 15 in the front and rear direction. The insertion detection mechanism 16 includes two detection levers which are disposed on both end sides in the right and left direction of the card insertion part 4 and is capable of protruding to and retreating from the conveying passage 5 and two sensors for detecting respective movements of the two detection levers. At a standby time before a card 2 is inserted into the card reader 1, parts of the detection levers are disposed in the conveying passage 5. In this state, when a card 2 is inserted into the insertion port 3 so that the short widthwise direction of the card 2 is coincided with the front and rear direction, both ends on the right and left sides of the card 2 are respectively contacted with two detection levers and the detection levers are turned. Therefore, based on a detected result by the two sensors, it is detected that the card 2 has been inserted into the insertion port 3 so that the short widthwise direction of the card 2 is coincided with the front and rear direction.

The magnetic sensors 17 and 18 are, for example, flux gate sensors. Output signals having a level depending on a distance from a magnetic body are outputted from the magnetic sensors 17 and 18. Further, the magnetic sensors 17 and 18 are disposed so as to interpose the card 2 in the upper and lower direction which is inserted into the insertion port 3. In this embodiment, when a card 2 is inserted into the insertion port 3 so that the short widthwise direction of the card 2 is coincided with the front and rear direction in a state that a rear face of the card 2 faces a lower side, a level of an output signal outputted from the magnetic sensor 18 becomes higher than a level of an output signal outputted from the magnetic sensor 17. On the other hand, when a card 2 is inserted into the insertion port 3 so that the short widthwise direction of the card 2 is coincided with the front and rear direction in a state that a front face of the card 2 faces a lower side, a level of an output signal outputted from the magnetic sensor 17 becomes higher than a level of an output signal outputted from the magnetic sensor 18. Therefore, when a level of an output signal from the magnetic sensor 17 and a level of an output signal from the magnetic sensor 18 are compared with each other, it is detected whether a card 2 has been inserted into the insertion port 3 in a state that its rear face faces a lower side or, whether a card 2 has been inserted into the insertion port 3 in a state that its front face faces a lower side.

The metal sensor 19 is a magnetic type sensor which includes an excitation coil, a detection coil and a core around which the excitation coil and the detection coil are wound. The metal sensor 19 is disposed on a slightly front side relative to the magnetic sensors 17 and 18 in the front and rear direction. Further, the metal sensor 19 is disposed in the right and left direction at a position where the terminal part 2*b* of a card 2 inserted in a right posture is passed. In this embodiment, when a card 2 is inserted from one end 2*d* side in the short widthwise direction of the card 2 in a state that its rear face faces a lower side, the terminal part 2*b* of the card 2 is detected by the metal sensor 19. Further, even when a card 2 is inserted from the other end 2*e* side in the short widthwise direction of the card 2 in a state that its front face faces a lower side, the terminal part 2*b* of the card 2 is detected by the metal sensor 19. Therefore, based on detected results of the magnetic sensors 17 and 18 and a detected result of the metal sensor 19, it is detected whether the card 2 has been inserted from the one end 2*d* side of the card 2 or, whether the card 2 has been inserted from the other end 2*e* side of the card 2.

The infrared sensor 20 is a pyroelectric type infrared sensor and includes a pyroelectric element for detecting light including infrared rays by pyroelectric effect. As described above, the infrared sensor 20 detects a human motion ahead of the card reader 1. Specifically, the infrared sensor 20 detects a motion of a human hand or the like ahead of the card reader 1. Further, based on the infrared rays generated by a human being ahead of the card reader 1, the infrared sensor 20 detects a difference or the like between a body temperature of the human being ahead of the card reader 1 and an ambient temperature of the human being in a detecting range of the infrared sensor 20 and thereby motion of the human being ahead of the card reader 1 is detected. As shown in FIG. 1, the infrared sensor 20 is disposed on the front face side of the card insertion part 4.

(Structure of Card Conveying Mechanism and Structure of Conveying Passage)

The conveying passage 5 is formed in a substantially entire region of the card reader 1 in the front and rear direction. The card conveying mechanism 6 includes conveying rollers 31 through 33 structured to abut with an upper face of a card 2 for conveying the card 2, and pad rollers 34 through 36 which are oppositely disposed to the conveying rollers 31 through 33 from a lower side. An outer diameter of the conveying roller 31, an outer diameter of the conveying roller 32, and an outer diameter of the conveying roller 33 are equal to each other. Further, an outer diameter of the pad roller 34, an outer diameter of the pad roller 35, and an outer diameter of the pad roller 36 are equal to each other. The conveying roller 31 is disposed in an inside of the card insertion part 4. Specifically, the conveying roller 31 is disposed on the front side relative to the shutter member 14. The conveying rollers 32 and 33 are disposed in an inside of a main body part 37 of the card reader 1 which is disposed on a rear side with respect to the card insertion part 4. Specifically, the conveying roller 32 is disposed on a front side relative to the magnetic head 7 and an IC contact block 9 in the front and rear direction and is disposed on a rear side relative to the shutter member 14. Further, the conveying roller 33 is disposed on a rear side relative to an abutting part 66*a* of a positioning member 66 described below which structures a positioning mechanism 11. The conveying rollers 31 through 33 are respectively disposed on both end sides in the right and left direction of the conveying passage 5. The conveying rollers 31 through 33 are connected with a motor 39 through a power transmission mechanism 38 which is structured of a belt, pulleys, a gear train and the like. Further, the conveying roller 33 is disposed on a rear side relative to the magnetic head 7.

The pad roller 34 is urged toward the conveying roller 31 and is capable of abutting with a card 2 from a lower side. The pad roller 35 is urged toward the conveying roller 32 and is capable of abutting with a card 2 from a lower side. The pad roller 36 is urged toward the conveying roller 33 and is capable of abutting with a card 2 from a lower side. As described above, the conveying rollers 31 through 33 are respectively disposed on the both end sides in the right and left direction of the conveying passage 5, and the conveying rollers 31 through 33 are abutted with an upper face of a card 2 on the both end sides in its longitudinal direction and the pad rollers 34 through 36 are abutted with an under face of the card 2 on both end sides in its longitudinal direction. Specifically, the conveying rollers 31 through 33 and the pad rollers 34 through 36 are abutted with the portions avoiding the embossing area 2*c* on both end sides in a longitudinal direction of a card 2. In this embodiment, the conveying roller 32 is a first conveying roller, the conveying roller 33 is a second conveying roller, the pad roller 35 is a first pad roller, and the pad roller 36 is a second pad roller. In accordance with an embodiment of the present invention, it may be structured that the conveying rollers 31 through 33 are abutted with an under face of a card 2 and the pad rollers 34 through 36 are oppositely disposed to the conveying rollers 31 through 33 on an upper side.

As shown in FIG. 2, the conveying roller 31 and the conveying roller 32 are disposed so that a lower end of the conveying roller 31 and a lower end of the conveying roller 32 are set to be the same height as each other in the upper and lower direction (in other words, a contact position of the conveying roller 31 with a card 2 and a contact position of the conveying roller 32 with the card 2 are set to be the same height as each other in the upper and lower direction). In other words, a rotation shaft which rotates together with the conveying roller 31 and a rotation shaft which rotates together with the conveying roller 32 are disposed at the same height as each other.

On the other hand, the conveying roller 33 is disposed so that a lower end of the conveying roller 33 is set to be a lower side in the upper and lower direction relative to the lower ends of the conveying rollers 31 and 32 (in other words, a contact position of the conveying roller 33 with a card 2 is set to be a lower side in the upper and lower direction relative to the contact positions of the conveying rollers 31 and 32 with the card 2). In other words, a rotation shaft which rotates together with the conveying roller 33 is disposed at a lower position than the rotation shafts which rotate together with the conveying rollers 31 and 32.

Guide members 26 and 27 for guiding an under face of a card 2 are disposed in an inside of the main body part 37. The guide members 26 and 27 are fixed to a frame of the main body part 37 of the card reader 1. As described below, the magnetic head 7 is disposed between the conveying roller 32 and the pad roller 35 and the conveying roller 33 and the pad roller 36 in the front and rear direction, and the guide member 26 is disposed between the conveying roller 32 and the pad roller 35 and the magnetic head 7 in the front and rear direction. Further, the guide member 27 is, in the front and rear direction, disposed on a rear side relative to the magnetic head 7 and is disposed at substantially the same position as the positioning mechanism 11.

In this embodiment, two guide members 26 are respectively disposed on both end sides in the right and left direction of the conveying passage 5 (see FIGS. 6(A) and 6(B)). Further, the guide member 27 is provided with two guide parts 27a which are separately disposed with a predetermined space therebetween in the right and left direction. An upper face of the guide member 26 and an upper face of the guide part 27a structure a part of a lower face of the conveying passage 5. An opening part 28 is formed in the lower face of the conveying passage 5 between the guide member 26 and the guide part 27a. In other words, the conveying passage 5 is formed with the opening part 28. The opening part 28 is formed over a substantially entire region of the conveying passage 5 in the right and left direction. The guide part 27a functions as a guide for a card 2 toward the conveying roller 33 and the pad roller 36. A front end side of an upper face of the guide part 27a is formed in an inclined face inclining to a lower direction toward the front side. Further, a rear end side of the upper face of the guide part 27a is formed in an inclined face inclining to a lower direction toward the rear side. An upper end of the guide part 27a is set to be lower than the lower end of the conveying roller 33.

(Structure of Head Moving Mechanism and Structure of Portion Surrounding Magnetic Head)

The magnetic head 7 is disposed between the conveying roller 32 and the pad roller 35 and the conveying roller 33 and the pad roller 36 in the front and rear direction. Further, as described above, the magnetic head 7 is disposed between the guide member 26 and the guide member 27 in the front and rear direction.

The head moving mechanism 8 includes a carriage 42 on which the magnetic head 7 is mounted, a guide shaft 43 for guiding the carriage 42 in the right and left direction, a lead screw 44 for moving the carriage 42 in the right and left direction, a cam plate 45 for moving the magnetic head 7 up and down, and a turning prevention shaft 46 for preventing turning of the carriage 42 around the guide shaft 43. The carriage 42 includes a carriage main body 47 and a head holding member 48 which holds the magnetic head 7. The carriage main body 47 is attached with a female screw member 49 engaged with the lead screw 44, a slide bearing 50 engaged with the guide shaft 43, and a slide member 51 engaged with the turning prevention shaft 46. The lead screw 44 is connected with a motor 53 through a power transmission mechanism 52 structured of pulleys and a belt.

The carriage main body 47 is fixed with a fixed shaft 54 which turnably holds the head holding member 48 with the right and left direction as an axial direction. A torsion coil spring 55 is disposed between the carriage main body 47 and the head holding member 48 and the head holding member 48 is urged by an urging force of the torsion coil spring 55 so that the magnetic head 7 is moved upward with the fixed shaft 54 as a center. The cam plate 45 is formed in a long and thin elongated shape in the right and left direction and the head holding member 48 is rotatably attached with a roller 56 which is capable of abutting with cams 45a formed on both end sides in the right and left direction of the cam plate 45.

In this embodiment, when the motor 53 is driven and the lead screw 44 is rotated, the magnetic head 7 is moved in the right and left direction together with the carriage 42 along the guide shaft 43. The roller 56 is abutted with the cam 45a on both end sides in the right and left direction and, as shown by the two-dot chain line in FIG. 5, the magnetic head 7 is retreated to a lower side relative to the conveying passage 5 against an urging force of the torsion coil spring 55. In other words, the magnetic head 7 moving in the right and left direction is located at a head retreated position where the magnetic head 7 is retreated to a lower side from the conveying passage 5 on both end sides in the right and left direction.

On the other hand, the magnetic head 7 is moved in the right and left direction together with the carriage 42 and, when the roller 56 is disengaged from the cam 45a, the magnetic head 7 which is guided so as to be retreated by the cam 45a to a lower side relative to the conveying passage 5 is moved upward by the urging force of the torsion coil spring 55 and thereby the magnetic head 7 is capable of abutting with a magnetic stripe 2a of a card 2. In other words, when the roller 56 is disengaged from the cam 45a, the magnetic head 7 is located at a head abutting position where the magnetic head 7 is capable of abutting with a magnetic stripe 2a. When the carriage 42 is moved in the right and left direction while the magnetic head 7 is abutted with a magnetic stripe 2a, reading and recording of magnetic data are performed by the magnetic head 7. The magnetic head 7 is passed through the opening part 28 when the magnetic head 7 is moved in the right and left direction.

As described above, the head moving mechanism 8 moves the magnetic head 7 in the right and left direction and moves the magnetic head 7 between a head abutting position where the magnetic head 7 is capable of abutting with a magnetic stripe 2a and a head retreated position where the magnetic head 7 is retreated from the conveying passage 5. In this embodiment, the magnetic head 7 is connected with a control circuit board of the card reader 1 through a predetermined cable.

An opposite member 57 which is formed with an opposed face 57a for abutting the magnetic head 7 located at the head abutting position with a card 2 at a predetermined abutting pressure is disposed on an upper side with respect to the magnetic head 7. The opposite member 57 is fixed to a frame of the main body part 37 of the card reader 1 and is disposed on an upper side with respect to the conveying passage 5. The opposed face 57a is formed in a flat face shape which is perpendicular to the upper and lower direction. Further, the opposed face 57a is formed in a substantially rectangular long and thin flat face shape in the right and left direction. A width of the opposed face 57a in the right and left direction is substantially equal to the moving range of the magnetic head 7 in the right and left direction. Further, a width of the opposed face 57a in the front and rear direction is substantially equal to a width of the magnetic head 7 in the front and rear direction. Further, the opposed face 57a is located at a substantially same position in the upper and lower direction as the lower ends of the conveying rollers 31 and 32 (in other words, the contact positions of the conveying rollers 31 and 32 and a card 2). Specifically, a height of the opposed face 57*a* is set on a slightly upper side relative to the lower ends of the conveying rollers 31 and 32.

Figure 5:
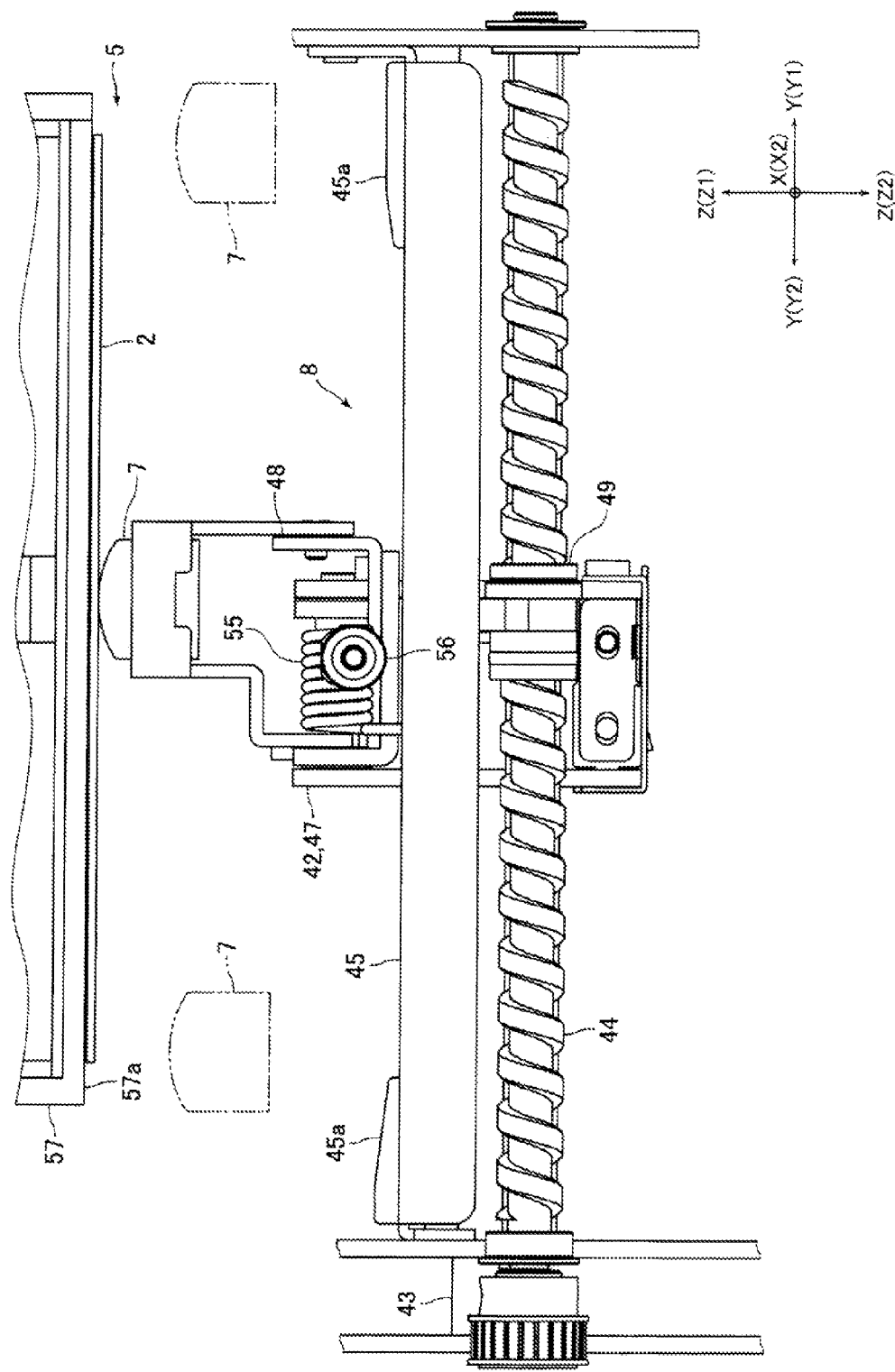
FIG. 5 is a front view for explaining the structure of the head moving mechanism shown in FIG. 2.

When the magnetic head 7 is located at the head abutting position, as shown in FIG. 5, a card 2 is sandwiched between the opposed face 57*a* and the magnetic head 7. In this case, the magnetic head 7 is abutted with a magnetic stripe 2*a* of a card 2 inserted in a right posture at a predetermined abutting pressure and an upper face of the card 2 (specifically, a front face of the card 2) is abutted with the opposed face 57*a* at a predetermined abutting pressure. The opposed face 57*a* structures a part of an upper face of the conveying passage 5 in the main body part 37 of the card reader 1. Further, the opposite member 57 is formed with guide parts 57*b* and 57*c* which structure a part of the upper face of the conveying passage 5 in the main body part 37 (see FIGS. 12(A), 12(B) and 12(C)). The guide part 57*b* is formed so as to protrude to a front side from a base part 57*d* where the opposed face 57*a* is formed. In this embodiment, the guide part 57*b* is formed at three positions, i.e., a center in the right and left direction and both ends in the right and left direction of the conveying passage 5. The guide part 57*c* is formed so as to protrude to a rear side from the base part 57*d*. In this embodiment, the guide part 57*c* is formed at one position, i.e., at a center in the right and left direction of the conveying passage 5. Under faces of the guide parts 57*b* and 57*c* are disposed on a slightly upper side relative to the opposed face 57*a*. The guide parts 57*b* and 57*c* are not shown except FIGS. 12(A), 12(B) and 12(C).

(Structure of IC Contact Block and Structure of Contact Block Moving Mechanism)

FIGS. 6(A) and 6(B) are front views for explaining a contact block moving mechanism 10 which drives an IC contact block 9 shown in FIG. 2.

The IC contact block 9 includes, as shown in FIGS. 6(A) and 6(B), a plurality of IC contact springs 59 structured to respectively contact with a plurality of external connection terminals structuring the terminal part 2*b* of a card 2, a spring holding member 60 holding the IC contact springs 59, and a circuit board 61 connected with the IC contact springs 59. A plurality of the IC contact springs 59 is arranged in two rows when viewed in the front and rear direction. The circuit board 61 is fixed to the spring holding member 60. The IC contact block 9 is disposed between the conveying roller 32 and the pad roller 35 and the magnetic head 7 in the front and rear direction. Further, the IC contact block 9 is disposed on a left end side in the right and left direction of the conveying passage 5 and is disposed on an upper side with respect to the conveying passage 5. A guide member 26 on a left end side of two guide members 26 is disposed on a lower side with respect to the IC contact block 9.

The contact block moving mechanism 10 includes a block holding member 62 to which the IC contact block 9 is fixed and a solenoid 63. The block holding member 62 is turnably held by a fixed shaft 64 which is fixed to a frame of the main body part 37 with the front and rear direction as an axial direction. A Fixed pin 65 is fixed to a plunger 63*a* of the solenoid 63. The fixed pin 65 is engaged with an engaging groove 62*a* formed in the block holding member 62. The solenoid 63 is disposed so that the plunger 63*a* is moved in the right and left direction. A compression coil spring not shown is disposed between the main body 63*b* of the solenoid 63 and the plunger 63*a*, and the plunger 63*a* is urged in a protruding direction from the main body 63*b* by an urging force of the compression coil spring.

When the plunger 63*a* is protruded from the main body 63*b* by an urging force of the compression coil spring, as shown in FIG. 6(A), the IC contact block 9 is retreated to an upper side with respect to the conveying passage 5. In other words, in this case, the IC contact block 9 is located at a spring retreated position where the IC contact springs 59 are retreated from the conveying passage 5. In this state, when the solenoid 63 is driven, the plunger 63*a* is moved to the main body 63*b* side against the urging force of the compression coil spring and, as shown in FIG. 6(B), the IC contact block 9 is moved downward. When the IC contact block 9 is moved downward, the IC contact springs 59 are set to be capable of contacting with the external connection terminals structuring the terminal part 2*b*. In other words, when the solenoid 63 is driven and the plunger 63*a* is pulled to the main body 63*b* side, the IC contact block 9 is located at the spring contact position where the IC contact springs 59 are capable of contacting with the external connection terminals. As described above, the contact block moving mechanism 10 moves the IC contact block 9 between the spring contact position where the IC contact springs 59 are capable of contacting with the external connection terminals and the spring retreated position where the IC contact springs 59 are retreated from the conveying passage 5.

(Structure of Positioning Mechanism)

Figure 7A:
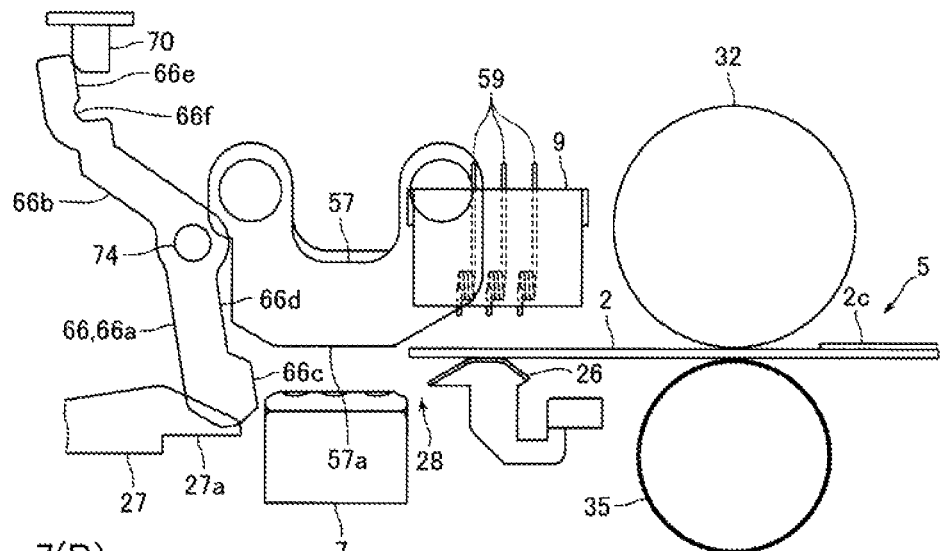
FIGS. 7(A) and 7(B) are side views for explaining a structure of a positioning member of a positioning mechanism and its surrounding portion shown in FIG. 2.
Figure 7B:
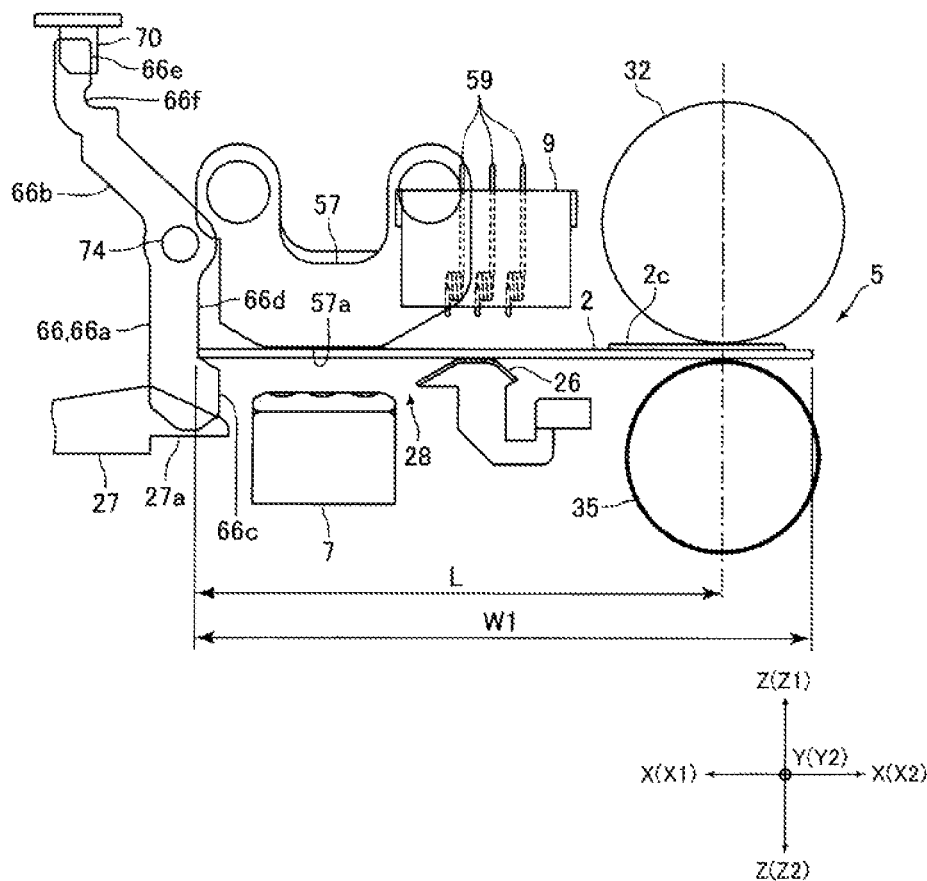
Figure 8A:
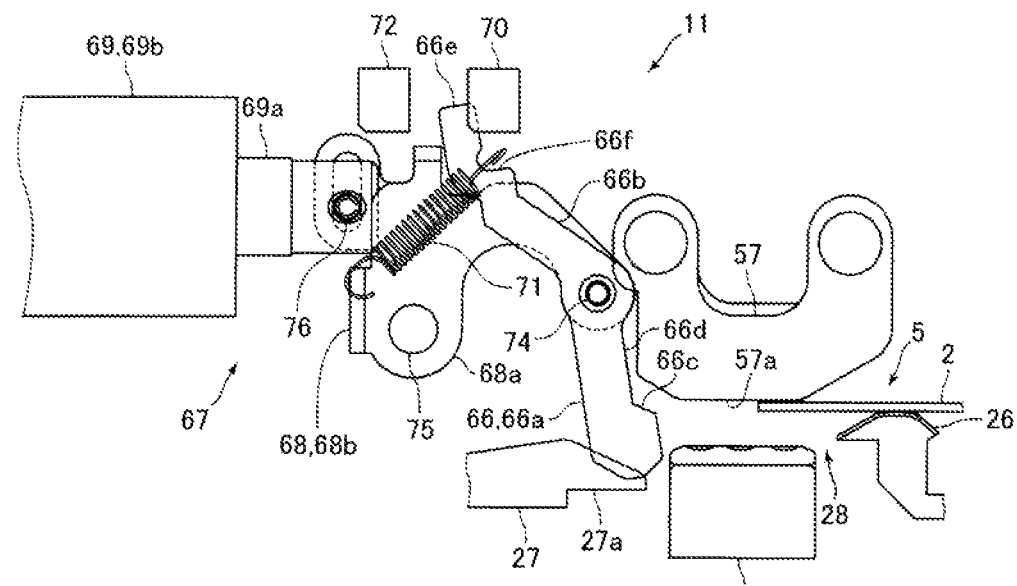
FIGS. 8(A) and 8(B) are side views for explaining a structure of the positioning mechanism and its surrounding portion shown in FIG. 2.
Figure 8B:
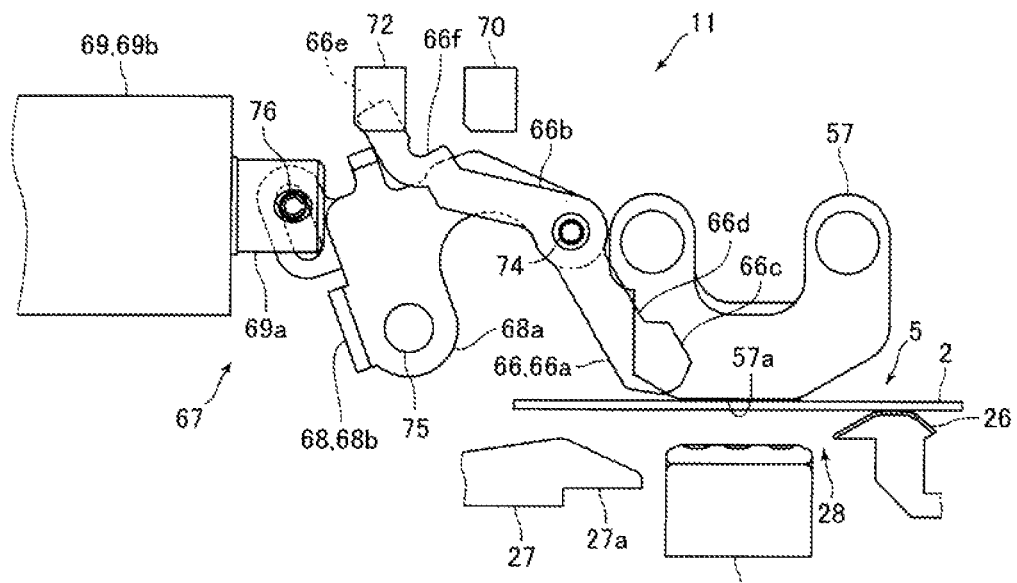
Figure 8B:
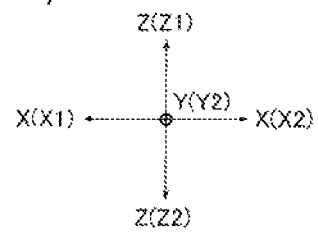
Figure 9:
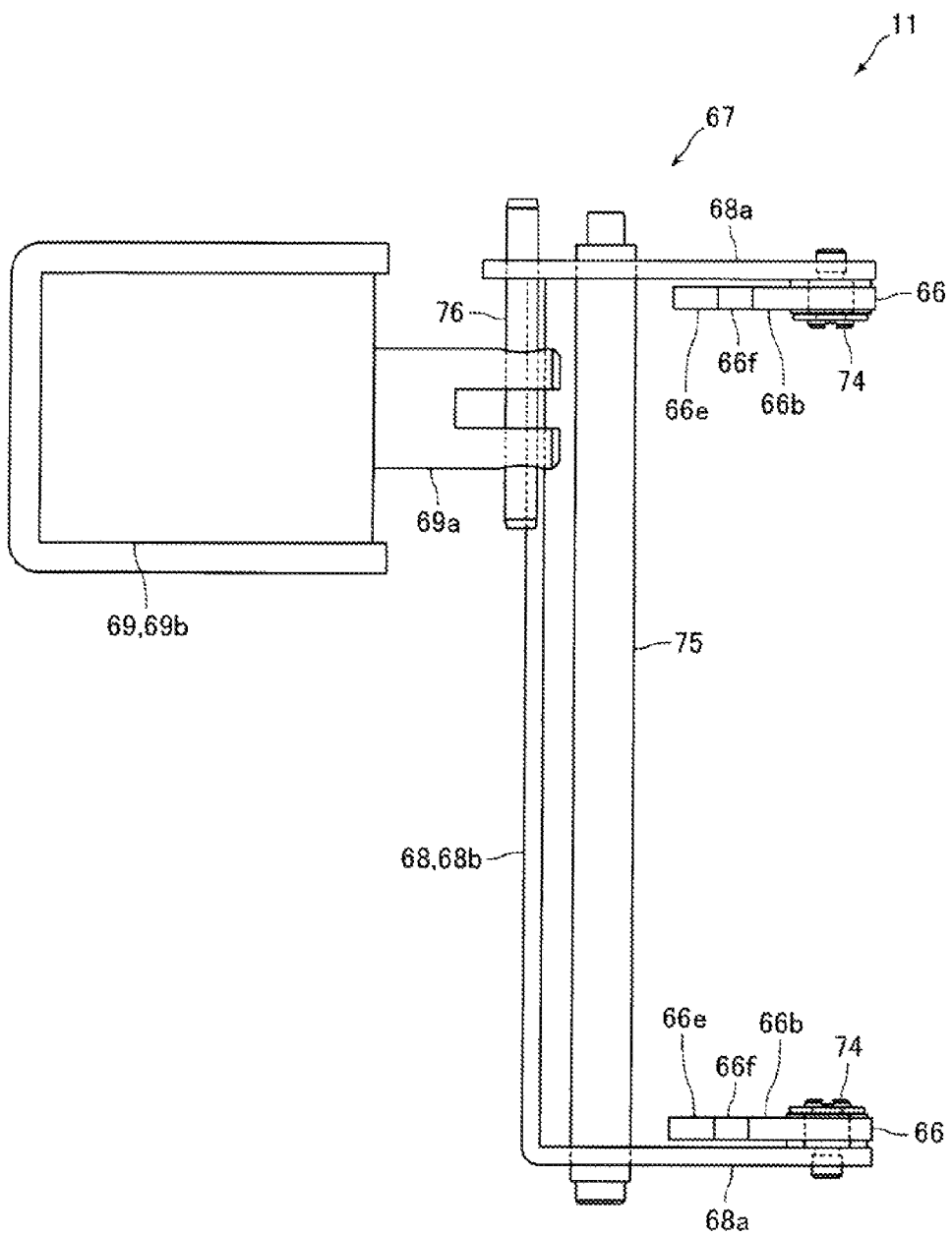
FIG. 9 is a top plan view for explaining a structure of the positioning mechanism shown in FIG. 2.
Figure 9:
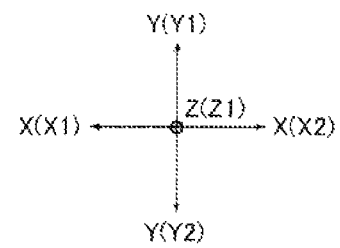

FIGS. 7(A) and 7(B) are side views for explaining a structure of a positioning member 66 of a positioning mechanism 11 and its surrounding portion shown in FIG. 2. FIGS. 8(A) and 8(B) are side views for explaining a structure of the positioning mechanism 11 and its surrounding portion shown in FIG. 2. FIG. 9 is a top plan view for explaining a structure of the positioning mechanism 11 shown in FIG. 2.

The positioning mechanism 11 includes two positioning members 66 which are formed with an abutting part 66*a* with which a rear end of a card 2 taken into the card reader 1 is abutted and a retreating mechanism 67 which makes the abutting part 66*a* retreat from the conveying passage 5. The retreating mechanism 67 includes a link member 68 which turnably holds the positioning member 66 and a solenoid 69. Further, the positioning mechanism 11 includes a sensor 70 for detecting movement of the positioning member 66 which is capable of turning, a tension coil spring 71 (see FIG. 8(A)) which urges the positioning member 66, and a sensor 72 which detects that the abutting part 66*a* is retreated from the conveying passage 5. The sensors 70 and 72 are transmission type optical sensors having a light emitting element and a light receiving element which receives light from the light emitting element.

The positioning member 66 is formed in a flat plate shape. The positioning member 66 is, in addition to the abutting part 66*a*, provided with an arm part 66*b* which is extended to a substantially upper side from an upper end of the abutting part 66*a*. The two positioning members 66 are separately disposed with a predetermined space therebetween in the right and left direction. Further, the positioning member 66 is turnably held by a fixed shaft 74 which is fixed to a holding part 68*a* described below structuring the link member 68. The fixed shaft 74 is fixed to the link member 68 with the right and left direction as an axial direction. The positioning member 66 is turnably held by the fixed shaft 74 at a boundary part between the abutting part 66*a* and the arm part 66*b*. A turning range of the positioning member 66 is restricted by a stopper (not shown) which is formed in the link member 68 or the like.

The abutting part 66*a* is formed in a substantially rectangular shape which is long and thin in the upper and lower direction. The abutting part 66a is disposed on a rear side relative to the magnetic head 7 in the front and rear direction. Further, the abutting part 66a is disposed on a front side relative to the conveying roller 33 and the pad roller 36 in the front and rear direction. A front end side of the abutting part 66a is formed with a support part 66c which supports a card 2 abutting with the abutting part 66a from its under face side. The support part 66c is formed on a lower end side of the abutting part 66a. Further, the support part 66c is formed so that its shape when viewed in the right and left direction is a substantially trapezoid shape (specifically, a substantially isosceles trapezoid shape) and is protruded to a front side relative to the abutting face 66d with which a card 2 is abutted. The abutting face 66d is disposed on an upper side with respect to an inclined face which is formed on a front end side of an upper face of the guide part 27a. An upper end face of the support part 66c is formed in an inclined face inclining to a lower direction toward the front side. In other words, when viewed in the right and left direction, the upper end face of the support part 66c is formed in an inclined face which is inclined in a direction separated from the conveying passage 5 toward the front side. An upper end side of the arm part 66b is formed with a light intercepting part 66e for intercepting between a light emitting element and a light receiving element of the sensor 70. A lower side of the light intercepting part 66e is formed with a spring engaging part 66f with which one end of the tension coil spring 71 is engaged. The other end of the tension coil spring 71 is fixed to a frame of the main body part 37.

In this embodiment, when a card 2 is not abutted with the abutting part 66a, the positioning member 66 is urged in a counterclockwise direction in FIG. 7(A) by an urging force of the tension coil spring 71 with the fixed shaft 74 as a center (see FIG. 7(A)). In this case, the abutting face 66d is inclined, for example, about 2° through 3° with respect to the upper and lower direction. In this state, when a rear end of a card 2 which is inserted through the insertion port 3 and conveyed to a rear side by the card conveying mechanism 6 is abutted with the abutting part 66a, as shown in FIG. 7(B), the abutting part 66a is pushed by the card 2 and thereby the positioning member 66 is turned in a clockwise direction in FIGS. 7(A) and 7(B) with the fixed shaft 74 as a center and is abutted with a stopper not shown. When the positioning member 66 is abutted with the stopper, the card 2 is positioned in the front and rear direction. In this case, the abutting face 66d is substantially parallel to the upper and lower direction. Further, in this case, for example, the card 2 is abutted with a boundary part between the support part 66c and the abutting face 66d.

In a case that a rear end of the card 2 is abutted with the abutting part 66a and the card 2 is positioned, a distance "L" in the front and rear direction between the center of the conveying roller 32 and the abutting face 66d (see FIG. 7(B)) is set to be shorter than a width "W1" in the short widthwise direction of the card 2. Further, a distance in the front and rear direction between the shutter member 14 and the abutting face 66d is set to be longer than the width "W1" in the short widthwise direction of the card 2. Further, when the rear end of the card 2 is abutted with the abutting part 66a and the card 2 is positioned, as shown in FIG. 7(B), the embossing area 2c of the card 2 is disposed on a front side relative to the opposed face 57a. A distance in the front and rear direction between the center of the conveying roller 32 and the center of the conveying roller 33 is set to be slightly shorter than the width "W1" in the short widthwise direction of the card 2.

As shown in FIG. 7(A), when a card 2 is not abutted with abutting part 66a, the light intercepting part 66e is separated from between a light emitting element and a light receiving element of the sensor 70. On the other hand, as shown in FIG. 7(B), when a rear end of the card 2 is abutted with the abutting part 66a, the light intercepting part 66e intercepts between the light emitting element and the light receiving element of the sensor 70. Therefore, since a light from the light emitting element to the light receiving element of the sensor 70 is intercepted by the light intercepting part 66e, it is detected that the card 2 has been positioned in the front and rear direction. In other words, based on a detected result by the sensor 70, it is detected that the card 2 has been positioned at a predetermined position in the front and rear direction.

The link member 68 is, as shown in FIG. 9, provided with two flat plate-shaped holding parts 68a which hold the positioning members 66 and a flat plate-shaped connecting part 68b connecting the two holding parts 68a with each other. Two holding parts 68a are disposed with a predetermined space therebetween in the right and left direction and structure both end side portions in the right and left direction of the link member 68. A rear end side and a lower end side of the holding part 68a is turnably supported by the fixed shaft 75 which is fixed with the right and left direction as an axial direction. The fixed shaft 74 is fixed to a front end side of the holding part 68a.

The solenoid 69 is disposed so that its plunger 69a is moved in the front and rear direction. A fixed pin 76 is fixed to the plunger 69a. The fixed pin 76 is engaged with a rear end side of the holding part 68a disposed on the right side. A compression coil spring not shown is disposed between the main body 69b of the solenoid 69 and the plunger 69a, and the plunger 69a is urged in a protruding direction from the main body 69b by an urging force of the compression coil spring.

As shown in FIG. 8(A), when the plunger 69a is protruded from the main body 69b by an urging force of the compression coil spring, a rear end of a card 2 is capable of abutting with the abutting part 66a. In other words, in this case, the abutting part 66a is located at the abutting position where a rear end of a card 2 is capable of abutting. In this state, when the solenoid 69 is driven, the plunger 69a is pulled into the main body 69b side against an urging force of the compression coil spring and thereby the link member 68 is turned in a counterclockwise direction in FIG. 8(A) with the fixed shaft 75 as a center. When the link member 68 is turned in a counterclockwise direction, as shown in FIG. 8(B), the abutting part 66a is retreated from the conveying passage 5 to an upper side and thus a card 2 is capable of passing toward the conveying roller 33 and the pad roller 36. In other words, when the plunger 69a is pulled into the main body 69b side, the abutting part 66a is located at the retreated position where the abutting part 66a is retreated from the conveying passage 5 and a card 2 is capable of passing toward the conveying roller 33 and the pad roller 36. In this embodiment, the positioning member 66 is normally located at the abutting position and, when a predetermined processing is to be performed, the positioning member 66 is moved to the retreated position.

As shown in FIG. 8(A), when the abutting part 66a is located at the abutting position, the light intercepting part 66e is separated from between the light emitting element and the light receiving element of the sensor 72. On the other hand, as shown in FIG. 8(B), when the abutting part 66a is located at the retreated position, the light intercepting part 66e intercepts between the light emitting element and the light receiving element of the sensor 72. Therefore, it is detected that the abutting part 66a has been retreated from the conveying passage 5 by intercepting light from the light emitting element to the light receiving element of the sensor 72 by the light intercepting part 66e. In other words, based on a detected result by the sensor 72, it is detected that the abutting part 66a has been retreated from the conveying passage 5.

(Schematic Operation of Card Reader)

Figure 10:
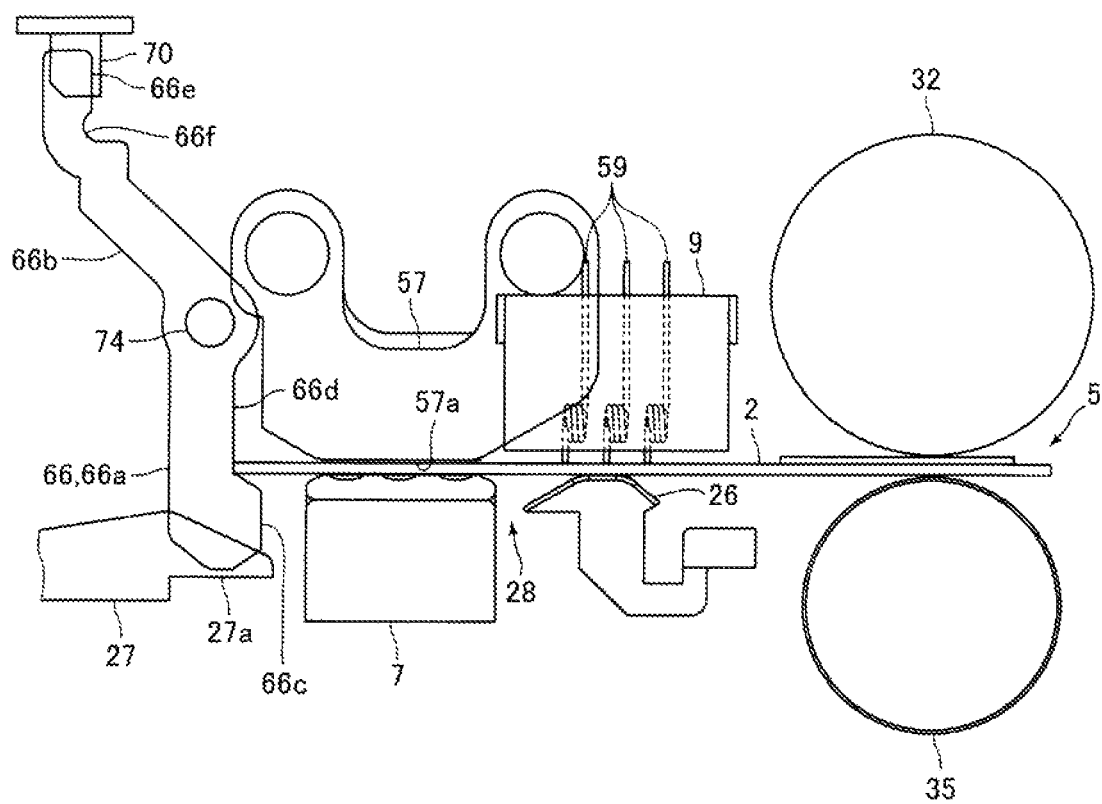
FIG. 10 is a side view for explaining a state when data communication is performed between an IC contact block shown in FIG. 2 and a card.
Figure 10:
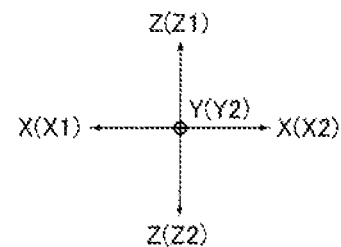

FIG. 10 is a side view for explaining a state when data communication is performed between the IC contact block 9 shown in FIG. 2 and a card.

In the card reader 1 structured as described above, at a standby time before a card 2 is inserted into the insertion port 3, the shutter member 14 is located at the close position and the conveying passage 5 is closed. Further, in this standby state, the magnetic head 7 is located at the head retreated position where the magnetic head 7 is retreated from the conveying passage 5, and the IC contact block 9 is located at the spring retreated position where the IC contact block 9 is retreated from the conveying passage 5. In addition, in this standby state, the abutting part 66a is located at the abutting position.

The shutter member 14 is moved to the open position based on the following detected results. In other words, it is detected that a card 2 has been inserted into the insertion port 3 based on a detected result by the sensor 21, it is detected that the card 2 has been inserted into the insertion port 3 so that the short widthwise direction of the card 2 is coincided with the front and rear direction based on a detected result by the sensor structuring the insertion detection mechanism 16 and, in addition, it is detected that one end 2d side of the card 2 has been inserted in a state that a rear face of the card 2 having the terminal part 2b and recorded magnetic data faces a lower side based on detected results by the magnetic sensors 17 and 18 and the metal sensor 19. In other words, when it is detected that a normal card 2 has been inserted into the insertion port 3 in a right posture, the shutter member 14 is moved to the open position.

Further, when it is detected that a normal card 2 has been inserted into the insertion port 3 in a right posture, the motor 39 is activated and the card conveying mechanism 6 conveys the card 2 to a rear side. When one end 2d of the card 2 is abutted with the abutting part 66a of the positioning member 66, the light from the light emitting element to the light receiving element of the sensor 70 is intercepted by the light intercepting part 66e and thereby it is detected that the card 2 has been positioned in the front and rear direction. When it is detected that the card 2 has been positioned, the motor 39 is stopped. In this embodiment, when one end 2d of the card 2 is abutted with the abutting part 66a, the entire card 2 is taken into a rear side relative to the shutter member 14. Therefore, when one end 2d of the card 2 is abutted with the abutting part 66a and it is detected that the card 2 has been positioned in the front and rear direction, the shutter member 14 is moved to the close position and the conveying passage 5 is closed.

Further, after that, the motor 53 is activated and the magnetic head 7 is moved in the right and left direction while abutting with a magnetic stripe 2a of the card 2 and thereby reading and recording of magnetic data are performed. As described above, the distance "L" in the front and rear direction between the center of the conveying roller 32 and the abutting face 66d is set to be shorter than the width "W1" in the short widthwise direction of the card 2 and, in a state that one end 2d of the card 2 is abutted with the abutting face 66d, a front end side of the card 2 is sandwiched between the conveying roller 32 and the pad roller 35. In this embodiment, the magnetic head 7 is moved in the right and left direction while the card 2 is held between the conveying roller 32 and the pad roller 35 in a state that one end 2d of the card 2 is pressed against the abutting face 66d by the card conveying mechanism 6 and thereby reading and recording of magnetic data are performed.

Further, the solenoid 63 is activated and thereby the IC contact springs 59 are contacted with the external connection terminals structuring the terminal part 2b of the card 2 to perform data communication with the card 2. In this case, in a state that the one end 2d of the card 2 is pressed against the abutting face 66d, the IC contact block 9 is moved down to make the IC contact springs 59 come in contact with the external connection terminals while the card 2 is held between the conveying roller 32 and the pad roller 35.

At the time when the external connection terminals of a card 2 and the IC contact springs 59 are contacted with each other, as shown in FIG. 6(B) and FIG. 10, the magnetic head 7 is located at the head abutting position and is abutted with an under face (rear face) of the card 2. In other words, at the time when the external connection terminals of a card 2 and the IC contact springs 59 are to be contacted with each other, the motor 53 is activated and the magnetic head 7 is moved from the head retreated position to the head abutting position. In this embodiment, as shown in FIG. 6(B), at the time when the external connection terminals of a card 2 and the IC contact springs 59 are contacted with each other, when viewed in the front and rear direction, the IC contact block 9 and the magnetic head 7 are overlapped with each other in the upper and lower direction. In other words, at the time when the external connection terminals of a card 2 and the IC contact springs 59 are contacted with each other, when viewed in the front and rear direction, the card 2 is sandwiched between the IC contact block 9 and the magnetic head 7. More specifically, as shown in FIG. 6(B), in a case that, when viewed in the front and rear direction, a contacting point of one row of the IC contact springs 59 arranged in two rows with the external connection terminals of a card 2 are defined as the "P1" and a contacting point of the other row of the IC contact springs 59 with the external connection terminals of the card 2 is defined as the "P2", at the time when the external connection terminals of a card 2 and the IC contact springs 59 are contacted with each other, when viewed in the front and rear direction, the center in the right and left direction between the contacting point "P1" and the contacting point "P2" is overlapped with the center in the right and left direction of the magnetic head 7 in the upper and lower direction. Further, in this embodiment, at the time when the IC contact springs 59 and the external connection terminals of a card 2 are contacted with each other, an abutting pressure of the magnetic head 7 with an under face of the card 2 is larger than a contact pressure of a plurality of the IC contact springs 59 with a plurality of the external connection terminals (in other words, larger than the sum total of respective contact pressures of the respective IC contact springs 59 and the respective external connection terminals).

Figure 12A:
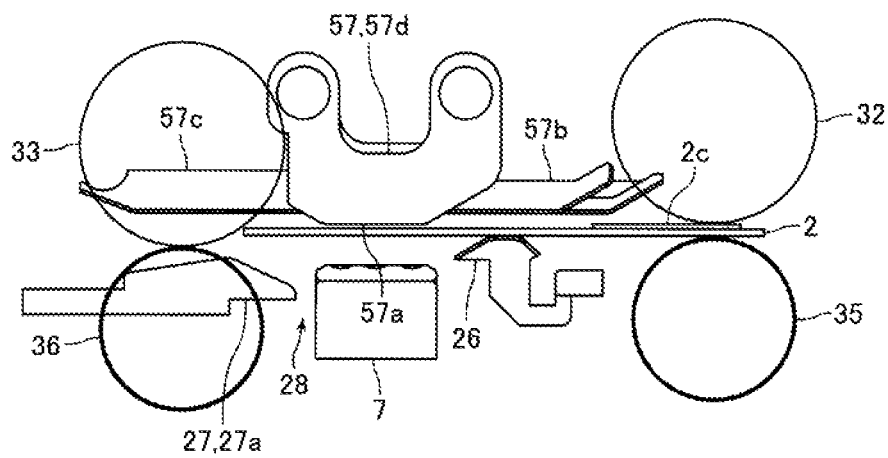
FIGS. 12(A), 12(B) and 12(C) are views for explaining a state that an abutting part shown in FIGS. 7(A) and 7(B) is retreated from a conveying passage and a card is conveyed to a further inner side with respect to a magnetic head.
Figure 12B:
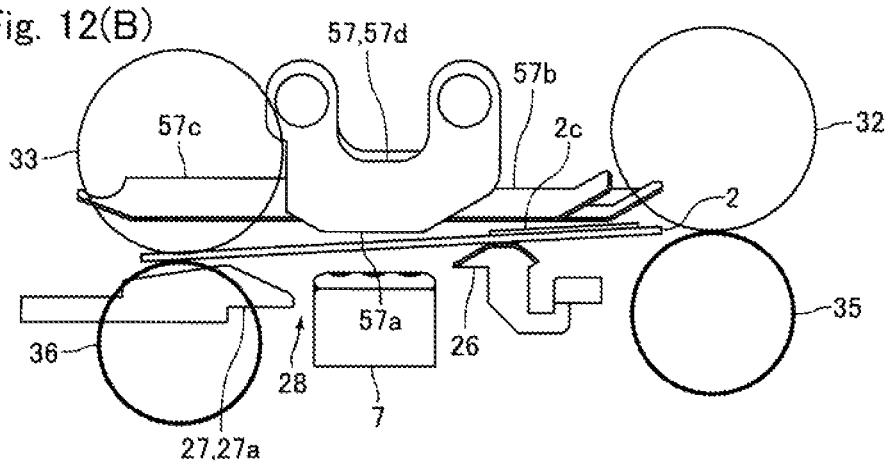
Figure 12C:
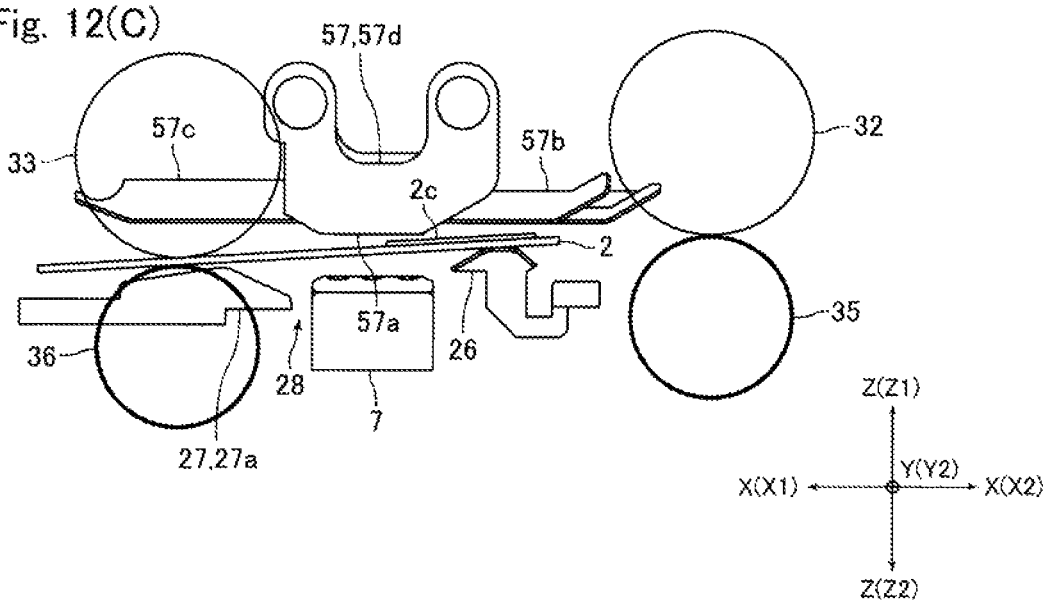

Further, in a case that a card 2 taken into an inside of the card reader 1 is to be conveyed to a rear side relative to the magnetic head 7 to perform a predetermined processing on the card 2 or to collect the card 2, the solenoid 69 is driven to move the abutting part 66a to the retreated position and the card 2 is conveyed to the rear side by the card conveying mechanism 6. The card 2 conveyed to the rear side is, as shown in FIG. 12(A), conveyed by the conveying roller 32 and the pad roller 35 and then, as shown in FIGS. 12(B) and 12(C), the card 2 is conveyed by the conveying roller 33 and the pad roller 36. In this case, the under face of the card 2 is supported by the guide member 26.

In this embodiment, as described above, the conveying roller 33 is disposed so that a contact position of the conveying roller 33 with a card 2 is lower than a contact position of the conveying roller 32 with the card 2. Therefore, when an embossing area 2c of a card 2 is passed through a lower side of the opposed face 57a, as shown in FIG. 12(C), characters, digits or the like formed by embossing (embossed portion) do not contact with the opposed face 57a, or contact with the opposed face 57a at a small contact pressure.

(Principal Effects in this Embodiment)

As described above, in this embodiment, at the time when the external connection terminals of a card 2 and the IC contact springs 59 are contacted with each other, the magnetic head 7 is located at the head abutting position and is abutted with an under face (rear face) of the card 2. Therefore, in this embodiment, even when the opening part 28 where the magnetic head 7 is passed is formed in the conveying passage 5 on a just rear side with respect to the IC contact block 9, at the time when the external connection terminals of a card 2 and the IC contact springs 59 are contacted with each other, the card 2 is supported by the magnetic head 7 and a support force for the card 2 is secured. Accordingly, in this embodiment, for example, even when a card 2 whose rear face is formed with a magnetic stripe 2a and whose front face is formed with the external connection terminals like a contact type IC card 2 with a magnetic stripe in conformity with the international standard is conveyed in its short widthwise direction and is processed, a contact pressure of the external connection terminals of the card 2 and the IC contact springs 59 can be secured.

Especially, in this embodiment, at the time when the external connection terminals of a card 2 and the IC contact springs 59 are contacted with each other, when viewed in the front and rear direction, the IC contact block 9 and the magnetic head 7 are overlapped with each other in the upper and lower direction and the card 2 is sandwiched between the IC contact block 9 and the magnetic head 7. Therefore, in this embodiment, when the IC contact springs 59 are to be contacted with the external connection terminals of the card 2, a force applied to the card 2 is easily and directly received by the magnetic head 7. Accordingly, in this embodiment, at the time when the external connection terminals of the card 2 and the IC contact springs 59 are contacted with each other, a support force for the card 2 can be increased by the magnetic head 7 and, as a result, a contact pressure of the IC contact springs 59 with the external connection terminals of the card 2 can be increased.

Further, in this embodiment, at the time when the IC contact springs 59 and the external connection terminals of the card 2 are contacted with each other, an abutting pressure of the magnetic head 7 with an under face of the card 2 is set to be larger than a contact pressure of a plurality of the IC contact springs 59 with a plurality of the external connection terminals. Therefore, in this embodiment, at the time when the IC contact springs 59 and the external connection terminals of the card 2 are contacted with each other, the card 2 is capable of being prevented from escaping to a lower direction by the magnetic head 7. Accordingly, in this embodiment, a contact pressure of the IC contact springs 59 and the external connection terminals of the card 2 can be increased.

In addition, in this embodiment, the abutting part 66a with which one end 2d of a card 2 is abutted is formed with the support part 66c which supports the card 2 from an under face side of the card 2. Therefore, in this embodiment, at the time when the external connection terminals of the card 2 and the IC contact springs 59 are contacted with each other, the card 2 is supported by the support part 66c in addition to the magnetic head 7. Accordingly, in this embodiment, at the time when the external connection terminals of the card 2 and the IC contact springs 59 are contacted with each other, a support force for the card 2 can be increased and, as a result, a contact pressure of the IC contact springs 59 with the external connection terminals of the card 2 can be increased.

In this embodiment, when reading and recording of magnetic data are to be performed by the magnetic head 7 and, when data communication is to be performed with a card 2 by the IC contact block 9, the card 2 is abutted with the abutting face 66d and is positioned. Therefore, in this embodiment, the magnetic head 7 and the magnetic stripe 2a can be surely abutted with each other, and the IC contact springs 59 and the external connection terminals of the card 2 can be surely contacted with each other. Further, in this embodiment, when reading and recording of magnetic data are to be performed by the magnetic head 7 and, when data communication is to be performed with a card 2 by the IC contact block 9, the card 2 is positioned by the common abutting part 66a and thus, structure of the card reader 1 can be simplified.

On the other hand, in a case that a card 2 is positioned by the common abutting part 66a when reading and recording of magnetic data are to be performed by the magnetic head 7 and, when data communication is to be performed with the card 2 by the IC contact block 9, a distance in the front and rear direction between the opening part 28 and the IC contact block 9 is required to be short. However, according to this embodiment, even when a distance in the front and rear direction between the opening part 28 and the IC contact block 9 is short, at the time when the IC contact springs 59 and the external connection terminals of the card 2 are contacted with each other, the card 2 is supported by the magnetic head 7 and thus, a contact pressure of the IC contact springs 59 with the external connection terminals of the card 2 can be secured.

Further, in this embodiment, in a card 2 with a magnetic stripe 2a in conformity of the international standard and JIS standard, the magnetic head 7 is moved and reading and recording of magnetic data are performed in a state that one end 2d of the card 2 which is the reference of a forming range of the magnetic stripe 2a is abutted with the abutting part 66a and thereby the card 2 is positioned. Therefore, in this embodiment, when reading and recording of magnetic data are to be performed, aligning of the magnetic head 7 with the magnetic stripe 2a can be performed with a high degree of accuracy. Accordingly, in this embodiment, even when a card 2 with a magnetic stripe 2a in conformity of the international standard and JIS standard is conveyed in its short widthwise direction and is processed, lowering of reading accuracy and recording accuracy of magnetic data can be suppressed.

In this embodiment, the abutting part 66a is formed with the support part 66c which supports a card 2 abutted with the abutting face 66d from its under face side. Therefore, in this embodiment, even in a case that the opening part 28 is formed in the conveying passage 5, when a card 2 whose one end 2d side is deformed toward a lower side is taken into an inside of the card reader 1, the deformed one end 2d side of the card 2 is supported by the support part 66c and thus a displacement amount on the one end 2d side of the card 2 from the conveying passage 5 can be made small. Accordingly, in this embodiment, even when a card 2 whose one end 2*d* side is deformed toward a lower side is taken into an inside of the card reader 1, flapping of the card 2 when the magnetic head 7 which is moved from the head retreated position to the head abutting position is abutted with the card 2 can be suppressed.

In other words, in a case that one end 2*d* side of a card 2 whose one end 2*d* side is deformed toward a lower side is not supported by the support part 66*c*, as shown by the two-dot chain line in FIG. 7(B), one end 2*d* side of the card 2 is displaced from the conveying passage 5 to a lower side and, as a result, when the magnetic head 7 moved from the head retreated position to the head abutting position is to be abutted with the card 2, the card 2 may be easily flapped. However, according to this embodiment, when the magnetic head 7 moved from the head retreated position to the head abutting position is to be abutted with the card 2, flapping of the card 2 can be suppressed. As a result, in this embodiment, even when a card 2 whose one end 2*d* side is deformed toward a lower side is taken into an inside of the card reader 1, deterioration of reading jitters and recording jitters of magnetic data can be suppressed and lowering of reading accuracy and recording accuracy of magnetic data can be suppressed.

Further, in this embodiment, the support part 66*c* which supports a card 2 abutted with the abutting face 66*d* from its under face side is formed in the abutting part 66*a* and thus, at the time when the external connection terminals of the card 2 and the IC contact springs 59 are contacted with each other, the card 2 is supported by the support part 66*c*. Therefore, according to this embodiment, at the time when the external connection terminals of the card 2 and the IC contact springs 59 are contacted with each other, a support force for the card 2 can be secured and, as a result, a contact pressure of the IC contact springs 59 with the external connection terminals of the card 2 can be secured.

Especially, in this embodiment, at the time when the external connection terminals of a card 2 and the IC contact springs 59 are contacted with each other, the magnetic head 7 is located at the head abutting position and is abutted with an under face (rear face) of the card 2. Therefore, in this embodiment, even when the opening part 28 where the magnetic head 7 is passed is formed in the conveying passage 5 on a just rear side with respect to the IC contact block 9, at the time when the external connection terminals of a card 2 and the IC contact springs 59 are to be contacted with each other, the card 2 is supported by the magnetic head 7 in addition to the support part 66*c* and thus a support force for the card 2 can be increased. Accordingly, in this embodiment, a contact pressure of the external connection terminals of the card 2 with the IC contact springs 59 can be increased.

In this embodiment, an upper end face of the support part 66*c* is formed in an inclined face which is inclined to a lower direction toward the front side. Therefore, in this embodiment, even when a card 2 whose one end 2*d* side is deformed toward a lower side is taken into an inside of the card reader 1, the one end 2*d* of the card 2 can be guided to the abutting face 66*d* by an upper end face of the support part 66*c*.

In this embodiment, it is detected that a card 2 has been positioned in the front and rear direction based on a detected result by the sensor 70 which detects movement of the positioning member 66. Therefore, according to this embodiment, in comparison with a case that, in addition to the positioning member 66, another member is provided for detecting that a card 2 has been positioned in the front and rear direction, the structure of the card reader 1 can be simplified.

In this embodiment, the conveying roller 33 and the pad roller 36 are disposed on a rear side relative to the abutting part 66*a*, and a distance between the conveying roller 32 and the conveying roller 33 in the front and rear direction is slightly shorter than the width "W1" in the short widthwise direction of the card 2. Further, in this embodiment, when the solenoid 69 is driven, the abutting part 66*a* is moved to the retreated position where the abutting part 66*a* is retreated from the conveying passage 5 and thus a card 2 is capable of passing toward the conveying roller 33 and the pad roller 36. Therefore, in this embodiment, when the abutting part 66*a* is moved to the retreated position, a card 2 can be conveyed to a further rear side in the card reader 1 by the conveying roller 33 and the pad roller 36. Accordingly, in this embodiment, on a rear side of the card reader 1, various kinds of processing can be performed on a card 2 or a card 2 can be collected.

Further, in this embodiment, the opposite member 57 which is formed with the opposed face 57*a* for abutting the magnetic head 7 located at the head abutting position with a card 2 at a predetermined abutting pressure is disposed on an upper side with respect to the magnetic head 7. Therefore, in this embodiment, even when a card 2 with a magnetic stripe 2*a* in conformity with the international standard and JIS standard is conveyed in its short widthwise direction and is processed, an abutting pressure of the magnetic head 7 with the magnetic stripe 2*a* can be secured.

In this embodiment, the conveying roller 33 is disposed so that a contact position of the conveying roller 33 with a card 2 is set to be lower than a contact position of the conveying roller 32 with the card 2. Therefore, as described above, when an embossing area 2*c* of a card 2 is passed through a lower side of the opposed face 57*a*, the embossed portion does not contact with the opposed face 57*a*, or contact with the opposed face 57*a* at a small contact pressure. Accordingly, in this embodiment, in a card reader 1 in which the opposed face 57*a* whose width in the right and left direction is substantially equal to a moving range in the right and left direction of the magnetic head 7 is disposed on an upper side with respect to the magnetic head 7, even when an embossed card 2 is conveyed to a rear side with respect to the magnetic head 7, damage of the embossed portion can be prevented and abrasion of the opposed face 57*a* can be prevented.

As a comparison example, even if the conveying roller 33 is disposed so that a contact position of the conveying roller 33 with a card 2 and a contact position of the conveying roller 32 with the card 2 are set to be the same as each other in the upper and lower direction, when the opposite member 57 is structured so as to be capable of being retreated to an upper side, it is possible that contacting of the embossed portion of the card 2 conveyed to a rear side relative to the magnetic head 7 with the opposed face 57*a* is prevented, or a contact pressure of the embossed portion of the card 2 conveyed to a rear side relative to the magnetic head 7 with the opposed face 57*a* is reduced. However, in this case, a mechanism for retreating the opposite member 57 is required and thus structure of the card reader 1 becomes complicated. On the other hand, according to this embodiment, with a simple structure that a rotation shaft rotating together with the conveying roller 33 is disposed at a lower position than a rotation shaft rotating together with the conveying roller 32 and, as a result, it is attained that contacting of the embossed portion of the card 2 with the opposed face 57a is prevented, or that a contact pressure of the embossed portion of the card 2 with the opposed face 57a is reduced.

Further, in this embodiment, when a rear end of a card 2 is abutted with the abutting part 66a and the card 2 is positioned, an embossing area 2c of the card 2 is disposed on a front side relative to the opposed face 57a. Therefore, in this embodiment, in normal use where reading and recording of magnetic data are performed by the magnetic head 7 or data communication with a card 2 is performed by the IC contact block 9, the embossed part of the card 2 and the opposed face 57a are not contacted with each other. Accordingly, in this embodiment, in normal use, damage of the embossed portion can be surely prevented and abrasion of the opposed face 57a can be prevented surely.

In this embodiment, reading and recording of magnetic data are performed by moving the magnetic head 7 in a state that, in a card 2 with a magnetic stripe 2a in conformity with the international standard and JIS standard, one end 2d of the card 2 which is a reference for a forming range of the magnetic stripe 2a is abutted with the abutting part 66a and the card 2 is positioned. Therefore, in this embodiment, when reading and recording of magnetic data are to be performed, aligning of the magnetic head 7 with the magnetic stripe 2a can be performed with a high degree of accuracy. Accordingly, in this embodiment, even when a card 2 with a magnetic stripe 2a in conformity with the international standard and JIS standard is conveyed in its short widthwise direction and is processed, lowering of reading accuracy and recording accuracy of magnetic data can be suppressed.

In this embodiment, the abutting part 66a is disposed between the conveying roller 33 and the pad roller 36 and the magnetic head 7 in the front and rear direction. Therefore, in this embodiment, in normal use where reading and recording of magnetic data are performed by the magnetic head 7 or data communication with a card 2 is performed by the IC contact block 9, it is sufficient that the card 2 is conveyed by the conveying rollers 31 and 32 (in other words, without using the conveying roller 33) until the card 2 is abutted with the abutting part 66a. Accordingly, even when a contact position of the conveying roller 32 with a card 2 and a contact position of the conveying roller 33 with the card 2 is displaced from each other in the upper and lower direction, a state of a card 2 during conveyance in normal use can be stabilized.

OTHER EMBODIMENTS

Although the present invention has been shown and described with reference to a specific embodiment, various changes and modifications will be apparent to those skilled in the art from the teachings herein.

In the embodiment described above, at the time when the external connection terminals of a card 2 and the IC contact springs 59 are contacted with each other, when viewed in the front and rear direction, the center in the right and left direction between the contacting point "P1" and the contacting point "P2" is overlapped with the center in the right and left direction of the magnetic head 7 in the upper and lower direction. However, the center in the right and left direction between the contacting point "P1" and the contacting point "P2" may be displaced from the center in the right and left direction of the magnetic head 7. Further, in the embodiment described above, at the time when the external connection terminals of a card 2 and the IC contact springs 59 are contacted with each other, when viewed in the front and rear direction, the IC contact block 9 and the magnetic head 7 are overlapped with each other in the upper and lower direction. However, the IC contact block 9 and the magnetic head 7 may be displaced from each other in the right and left direction.

In the embodiment described above, at the time when the external connection terminals of a card 2 and the IC contact springs 59 are contacted with each other, an abutting pressure of the magnetic head 7 with an under face of a card 2 is set to be larger than a contact pressure of a plurality of the IC contact springs 59 with a plurality of the external connection terminals. However, the present invention is not limited to this embodiment. For example, at the time when the external connection terminals of a card 2 and the IC contact springs 59 are contacted with each other, an abutting pressure of the magnetic head 7 with an under face of a card 2 may be the same as a contact pressure of a plurality of the IC contact springs 59 with a plurality of the external connection terminals, or may be smaller than a contact pressure of a plurality of the IC contact springs 59 with a plurality of the external connection terminals In the embodiment described above, when reading and recording of magnetic data are to be performed by the magnetic head 7 and, when data communication is performed with a card 2 by the IC contact block 9, the card 2 is positioned by the common abutting part 66a. However, the present invention is not limited to this embodiment. For example, an abutting part with which a card 2 is abutted when reading and recording of magnetic data are to be performed by the magnetic head 7 may be separately provided from an abutting part with which a card 2 is abutted when data communication is performed with the card 2 by the IC contact block 9. Further, in the embodiment described above, the support part 66c is formed in the abutting part 66a but no support part 66c may be formed in the abutting part 66a.

Figure 11:
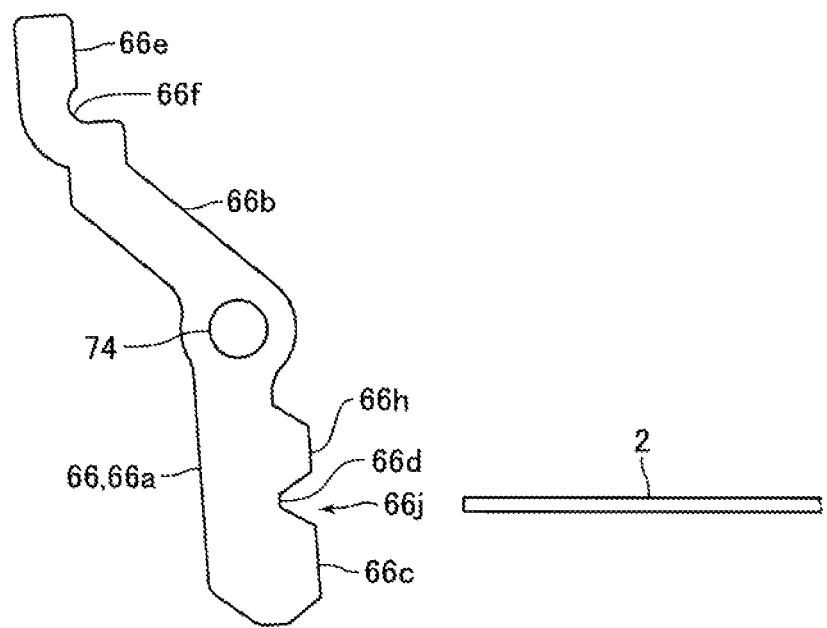
FIG. 11 is a side view for explaining a positioning member in accordance with another embodiment of the present invention.
Figure 11:
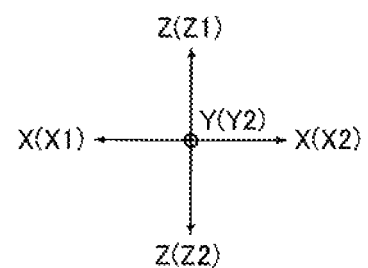

In the embodiment described above, as shown in FIG. 11, a protruded part 66h protruding to a front side relative to the abutting face 66d may be formed on an upper side with respect to the support part 66c. In this case, a lower end face of the protruded part 66h is formed in an inclined face which is inclined in an upper direction toward a front side. In other words, a front end face of the abutting part 66a may be formed with a cut-out part 66j whose width in an upper and lower direction becomes gradually narrower toward a rear side when viewed in a right and left direction. In this case, a lower side of the cut-out part 66j is formed as the support part 66c. In this case, in addition to a case that a card 2 whose one end 2d side is deformed toward a lower side is taken into an inside of the card reader 1, even in a case that a card 2 whose one end 2d side is deformed toward an upper side is taken into an inside of the card reader 1, the one end 2d of the card 2 can be guided to the abutting face 66d by an upper end face of the support part 66c or a lower end face of the protruded part 66h.

In the embodiment described above, at the time when the external connection terminals of a card 2 and the IC contact springs 59 are contacted with each other, the magnetic head 7 is located at the head abutting position and is abutted with an under face of the card 2. However, the present invention is not limited to this embodiment. For example, at the time when the external connection terminals of a card 2 and the IC contact springs 59 are contacted with each other, the magnetic head 7 may be located at the head retreated position.

In the embodiment described above, the respective pad rollers 34 through 36 are oppositely disposed to the respective conveying rollers 31 through 33. However, the present invention is not limited to this embodiment. For example, the conveying rollers connected with a drive source such as a motor may be oppositely disposed to the respective conveying rollers 31 through 33.

In the embodiment described above, the magnetic head 7 is retreated to a lower side relative to the conveying passage 5 on both end sides in the right and left direction. However, the present invention is not limited to this embodiment. For example, the magnetic head 7 may be retreated to a lower side relative to the conveying passage 5 on only one end side in the right and left direction. In this case, the cam 45*a* is formed on only one end side of the cam plate 45 in the right and left direction. Further, in the embodiment described above, the sensors 70 and 72 are optical type sensors but the sensors 70 and 72 may be mechanical sensors such as a micro switch.

In embodiment described above, the card conveying mechanism 6 is structured of the conveying rollers 31 through 33 and the pad rollers 34 through 36. However, the present invention is not limited to this embodiment. For example, the card conveying mechanism 6 may be structured of a belt which is abutted with an upper face or an under face of a card 2 for conveying the card 2. Further, the card conveying mechanism 6 may be, for example, structured of a holding mechanism for holding a card 2 and a moving mechanism for moving the holding mechanism in the front and rear direction.

In the embodiment described above, the card 2 is a card made of vinyl chloride whose thickness is about 0.7-0.8 mm. However, the present invention is not limited to this embodiment. For example, the card 2 may be a PET (polyethylene terephthalate) card whose thickness is about 0.18-0.36 mm or may be a paper card having a predetermined thickness. Further, in the embodiment described above, a contact type embossed IC card 2 with a magnetic stripe is processed in the card reader 1. However, an embossed card with a magnetic stripe having no IC chip may be processed in the card reader 1 or a contact type IC card without a magnetic stripe 2*a* may be processed in the card reader 1. Further, the card reader 1 may be provided with no IC contact block 9, no metal sensor 19 or the like.

In the embodiment described above, a magnetic stripe 2*a* is formed on a rear face of the card 2. However, the present invention is not limited to this embodiment. For example, a magnetic stripe may be formed on a front face of the card 2 instead of a rear face of the card 2 or in addition to the rear face of the card 2. For example, a magnetic stripe in conformity with the standard of JISX6302 may be formed on a front face of the card 2. In a case that a magnetic stripe is formed on only a front face of the card 2, the magnetic head 7 is disposed on an upper side relative to the conveying passage 5. Further, in a case that a magnetic stripe is formed on a front face of the card 2 in addition to the magnetic stripe 2*a*, the magnetic head 7 is disposed on both of an upper side and a lower side relative to the conveying passage 5.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card formed in a substantially rectangular shape which is conveyed in its short widthwise direction and is processed, the card having a magnetic stripe formed on one face of the card in parallel with a longitudinal direction of the card for performing at least one of reading of magnetic data recorded on the card and recording of magnetic data on the card, and the card having a plurality of external connection terminals of an IC chip formed on an other face of the card, the card reader comprising:
   a conveying passage where the card is conveyed;
   the magnetic stripe;
   a head moving mechanism structured to move the magnetic head in a widthwise direction of the conveying passage which is perpendicular to a conveying direction of the card and to move the magnetic head between a head abutting position where the magnetic head abuts with the magnetic stripe and a head retreated position where the magnetic head is retreated from the conveying passage;
   an IC contact block having a plurality of IC contact springs structured to respectively contact with the plurality of external connection terminals of the IC chip formed on the other face of the card; and
   a contact block moving mechanism structured to move the IC contact block between a spring contact position where the IC contact springs contact with the external connection terminals and a spring retreated position where the IC contact springs are retreated from the conveying passage;
   wherein the conveying passage is formed with an opening part through which the magnetic head is passed when the magnetic head is moved in the widthwise direction of the conveying passage; and
   wherein the magnetic head is located at the head abutting position and is abutted with the one face of the card at a time when the IC contact springs and the external connection terminals are contacted with each other.

2. The card reader according to claim 1, wherein at the time when the IC contact springs and the external connection terminals are contacted with each other, when viewed in a conveying direction of the card, the magnetic head is overlapped with the IC contact block in a thickness direction of the card.

3. The card reader according to claim 1, further comprising an opposite member which is formed with an opposed face structured to abut the magnetic head located at the head abutting position with the magnetic stripe at a predetermined abutting pressure,
   wherein at the time when the IC contact springs and the external connection terminals are contacted with each other, an abutting pressure of the magnetic head with the one face of the card is larger than a contact pressure of the plurality of the IC contact springs with the plurality of the external connection terminals.

4. The card reader according to claim 1, further comprising an abutting part with which one end of the card is abutted in a conveying direction of the card,
   wherein the card is abutted with the abutting part and is positioned when reading and/or recording of magnetic data by the magnetic head are performed and when communication of data with the card is performed by the IC contact block.

5. The card reader according to claim 4, wherein the abutting part is formed with a support part structured to support the card from a side of the one face of the card.

6. A card reader for use with a card formed in a substantially rectangular shape which is conveyed in its short widthwise direction and is processed, the card having a magnetic stripe formed on one face of the card in parallel with a longitudinal direction of the card for performing at least one of reading of magnetic data recorded on the card and recording of magnetic data on the card, the card reader comprising:
   a conveying passage where the card is conveyed;
   the magnetic stripe;
   a head moving mechanism structured to move the magnetic head in a widthwise direction of the conveying passage which is perpendicular to a conveying direction of the card and to move the magnetic head between a head abutting position where the magnetic head abuts with the magnetic stripe and a head retreated position where the magnetic head is retreated from the conveying passage; and
   an abutting part with which one end of the card in a conveying direction of the card is abutted and by which the card is positioned;
   wherein the conveying passage is formed with an opening part through which the magnetic head is passed when the magnetic head is moved in the widthwise direction of the conveying passage; and
   wherein the abutting part is formed with a support part structured to support the card from a side of the one face of the card.

7. The card reader according to claim 6, further comprising
   an IC contact block having an IC contact spring structured to contact with an external connection terminal of an IC chip formed on another face of the card, and
   a contact block moving mechanism structured to move the IC contact block between a spring contact position where the IC contact spring contacts with the external connection terminal and a spring retreated position where the IC contact spring is retreated from the conveying passage.

8. The card reader according to claim 6, further comprising
   a positioning member which is formed with the abutting part and turns with the widthwise direction of the conveying passage as an axial direction of turning, and
   a sensor structured to detect movement of the positioning member,
   wherein it is detected that the card has been positioned in the conveying direction of the card based on a detected result by the sensor.

9. The card reader according to one claim 6, further comprising
   a card conveying mechanism structured to convey the card, and
   a retreating mechanism structured to retreat the abutting part from the conveying passage,
   wherein the card conveying mechanism comprises a conveying roller which is disposed on a rear side relative to the abutting part in a taking-in direction of the card and is structured to abut with and convey the card.

10. The card reader according to claim 6, wherein an end face on a conveying passage side of the support part is formed in an inclined face which is inclined in a direction separated from the conveying passage toward a front side in a taking-in direction of the card when viewed in the widthwise direction of the conveying passage.

11. The card reader according to claim 6, wherein
    an end face on a front side of the abutting part in a taking-in direction of the card is formed with a cut-out part whose width in a thickness direction of the card becomes gradually narrower toward a rear side in the taking-in direction of the card when viewed in the widthwise direction of the conveying passage, and
    one end side of the cut-out part in the thickness direction of the card is formed to be the support part.

12. A card reader for use with a card formed in a substantially rectangular shape which is conveyed in its short widthwise direction and is processed, the card having a magnetic stripe formed on one face of the card in parallel with a longitudinal direction of the card for performing at least one of reading of magnetic data recorded on the card and recording of magnetic data on the card, the card reader comprising:
    a card conveying mechanism structured to convey the card;
    a conveying passage where the card is conveyed;
    the magnetic stripe;
    a head moving mechanism structured to move the magnetic head in a widthwise direction of the conveying passage which is perpendicular to a conveying direction of the card and to move the magnetic head between a head abutting position where the magnetic head abuts with the magnetic stripe and a head retreated position where the magnetic head is retreated from the conveying passage; and
    an opposite member which is formed with an opposed face structured to abut the magnetic head located at the head abutting position with the magnetic stripe at a predetermined abutting pressure;
    wherein the card conveying mechanism comprises a first conveying roller, which is disposed on a front side relative to the magnetic head in the taking-in direction of the card for contacting with the card and conveying the card, and a second conveying roller which is disposed on a rear side relative to the magnetic head in the taking-in direction of the card for contacting with the card and conveying the card; and
    wherein when a direction perpendicular to the conveying direction of the card and the widthwise direction of the conveying passage is referred to as a height direction of the conveying passage, the opposite member is disposed on one side of the conveying passage in the height direction of the conveying passage, and the second conveying roller is disposed so that a contact position of the second conveying roller with the card is located on the other side in the height direction of the conveying passage with respect to a contact position of the first conveying roller with the card.

13. The card reader according to claim 12, wherein the contact position of the first conveying roller with the card is set to be a substantially same position as the opposed face in the height direction of the conveying passage.

14. The card reader according to claim 12, wherein the card conveying mechanism comprises a first pad roller, which is oppositely disposed to the first conveying roller and is urged toward the first conveying roller, and a second pad roller which is oppositely disposed to the second conveying roller and is urged toward the second conveying roller.

15. The card reader according to claim 12, further comprising
an abutting part with which one end of the card in the conveying direction of the card is abutted and by which the card is positioned, and
a retreating mechanism structured to retreat the abutting part from the conveying passage,
wherein the abutting part is disposed between the magnetic head and the second conveying roller in the conveying direction of the card.

16. The card reader according to claim 15, wherein
an embossing area where embossing is performed is determined in the card, and
when the one end of the card in the conveying direction of the card is abutted with the abutting part, the embossing area is disposed on a front side relative to the opposed face in the taking-in direction of the card.

* * * * *